(12) United States Patent
Ha et al.

(10) Patent No.: US 11,914,129 B2
(45) Date of Patent: Feb. 27, 2024

(54) BACKGROUND-SUPPRESSED STED NANOSCOPE

(71) Applicant: THE JOHNS HOPKINS UNIVERSITY, Baltimore, MD (US)

(72) Inventors: Taekjip Ha, Baltimore, MD (US); Jong-Chan Lee, Baltimore, MD (US); Ye Ma, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 327 days.

(21) Appl. No.: 17/598,725

(22) PCT Filed: Mar. 26, 2020

(86) PCT No.: PCT/US2020/024982
§ 371 (c)(1),
(2) Date: Sep. 27, 2021

(87) PCT Pub. No.: WO2020/198487
PCT Pub. Date: Oct. 1, 2020

(65) Prior Publication Data
US 2022/0187584 A1    Jun. 16, 2022

Related U.S. Application Data

(60) Provisional application No. 62/823,713, filed on Mar. 26, 2019.

(51) Int. Cl.
*G01N 21/64* (2006.01)
*G02B 21/00* (2006.01)
*G02B 21/36* (2006.01)

(52) U.S. Cl.
CPC ..... *G02B 21/0076* (2013.01); *G01N 21/6458* (2013.01); *G02B 21/008* (2013.01); (Continued)

(58) Field of Classification Search
CPC ............ G02B 21/0076; G02B 21/0068; G02B 21/0072; G02B 21/008; G02B 21/367; G02B 27/58; G01N 21/6458
See application file for complete search history.

(56) References Cited

U.S. PATENT DOCUMENTS 5,715,334 A    2/1998  Peters
9,007,582 B2   4/2015  Glazowski
(Continued)

FOREIGN PATENT DOCUMENTS

CN    101907766 B    9/2011
CN    102313723 B    6/2014
(Continued)

OTHER PUBLICATIONS

Gao, et al., Background suppression in fluorescence nanoscopy with stimulated emission double depletion. Nat. Photonics 11, 163-169 (2017).
(Continued)

*Primary Examiner* — Kiho Kim

(57) ABSTRACT

The present invention is directed toward a system and method for STED nanography, which reduces background noise. To remove background noise from a STED image, the polarization of the STED beam is altered from that used to obtain the original image. A polarized image is obtained. This polarized image can then be subtracted from the original image to remove noise inherent to the image.

20 Claims, 23 Drawing Sheets

(52) U.S. Cl.
CPC ..... *G02B 21/0068* (2013.01); *G02B 21/0072* (2013.01); *G02B 21/367* (2013.01)

(56) References Cited

U.S. PATENT DOCUMENTS

| | | | |
|---|---|---|---|
| 2007/0253033 | A1 | 11/2007 | Johansen et al. |
| 2014/0145093 | A1 | 5/2014 | Hendriks et al. |
| 2015/0226950 | A1* | 8/2015 | Booth ................ G01N 21/636 250/459.1 |
| 2018/0373017 | A1* | 12/2018 | Dixon ................ G02B 21/0024 |
| 2019/0333199 | A1* | 10/2019 | Ozcan ................ G06T 3/4046 |

FOREIGN PATENT DOCUMENTS

| | | |
|---|---|---|
| CN | 103389573 B | 4/2015 |
| CN | 104482880 B | 4/2015 |

OTHER PUBLICATIONS

Richards, et al., Electromagnetic Diffraction in Optical Systems. II. Structure of the Image Field in an Aplanatic System. Proc. R. Soc. A Math. Phys. Eng. Sci. 253, 358-379 (1959).

Leutenegger, et al., Fast focus field calculations. Opt. Express 14, 4897-4903 (2006).

Klar, et al., Subdiffraction resolution in far-field fluorescence microscopy. Opt. Lett. 24, 954-6 (1999).

Klar, et al., Breaking Abbe's diffraction resolution limit in fluorescence microscopy with stimulated emission depletion beams of various shapes. Phys. Rev. E 64, 066613 (2001).

Rittweger, et al., STED microscopy reveals crystal colour centres with nanometric resolution. Nat. Photonics 3, 144-147 (2009).

Leutenegger, et al., Analytical description of STED microscopy performance. Opt. Express 18, 26417-29 (2010).

Hein, et al., Stimulated emission depletion (STED) nanoscopy of a fluorescent protein-labeled organelle inside a living cell. Proc. Natl. Acad. Sci. 105, 14271-14276 (2008).

Osseforth, et al., Simultaneous dual-color 3D STED microscopy. Opt. Express 22, 7028 (2014).

Han, et al., Dual-color three-dimensional STED microscopy with a single high-repetition-rate laser. Opt. Lett. 40, 2653-6 (2015).

Hanne, et al., STED nanoscopy with fluorescent quantum dots. Nat. Commun. 6, 7127 (2015).

Vicidomini, et al., STED with wavelengths closer to the emission maximum. Opt. Express 20, 5225 (2012).

Gao, et al., Precise background subtraction in stimulated emission double depletion nanoscopy. Opt. Lett. 42, 831 (2017).

Coto Hernandez, et al., A new filtering technique for removing anti-Stokes emission background in gated Cw-STED microscopy. Journal of Biophotonics 7, 376-380 (2014).

Lanzano, et al., Encoding and decoding spatio-temporal information for super-resolution microscopy. Nat. Commun. 6, (2015).

Vicidomini, et al., Sharper low-power STED nanoscopy by time gating. Nat. Methods 8, 571-573 (2011).

Vicidomini, et al., STED Nanoscopy with Time-Gated Detection: Theoretical and Experimental Aspects. PLoS One 8, (2013).

Hao, et al., Effects of polarization on the de-excitation dark focal spot in STED microscopy. J. Opt. 12, 115707 (2010).

Lukinavicius, et al., A near-infrared fluorophore for live-cell super-resolution microscopy of cellular proteins. Nat. Chem. 5, 132-139 (2013).

* cited by examiner

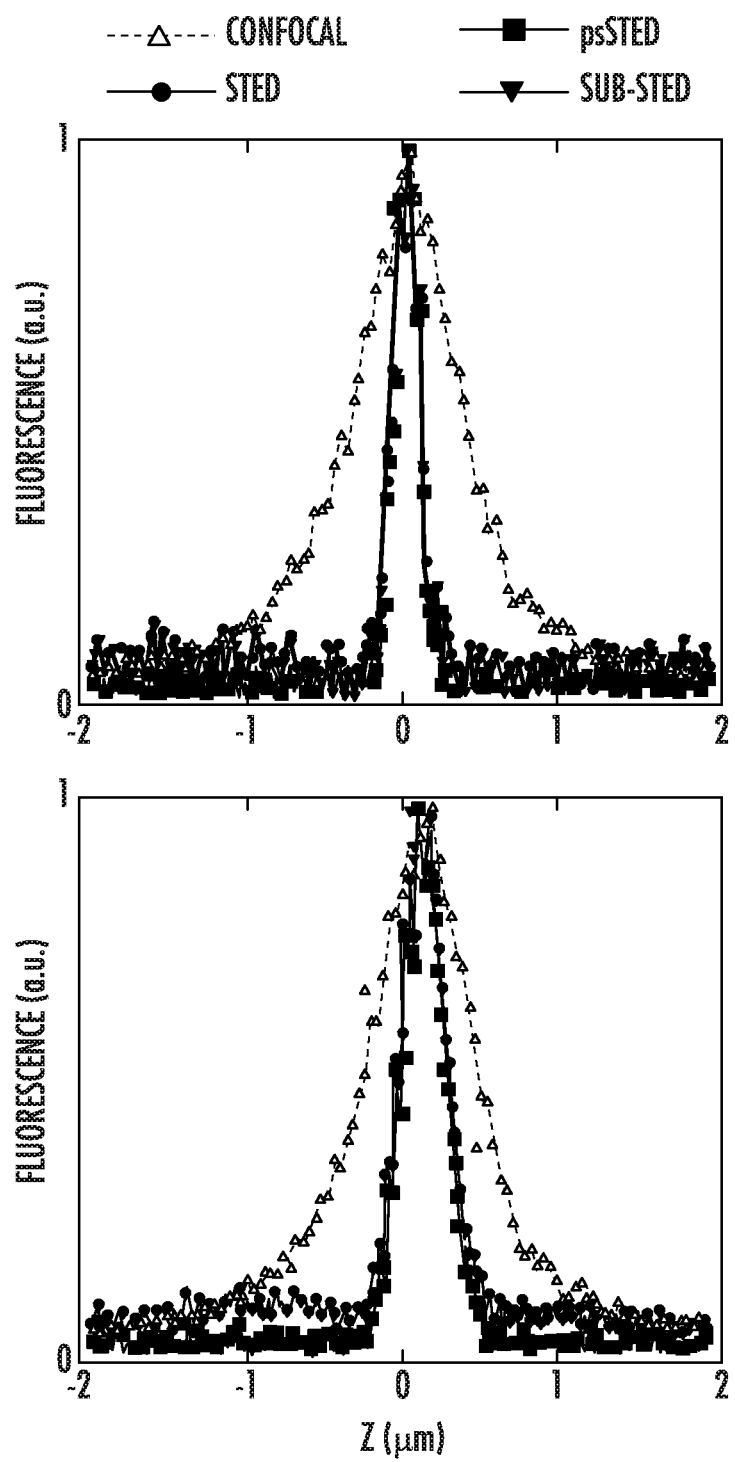
FIG. 2 CONTINUES

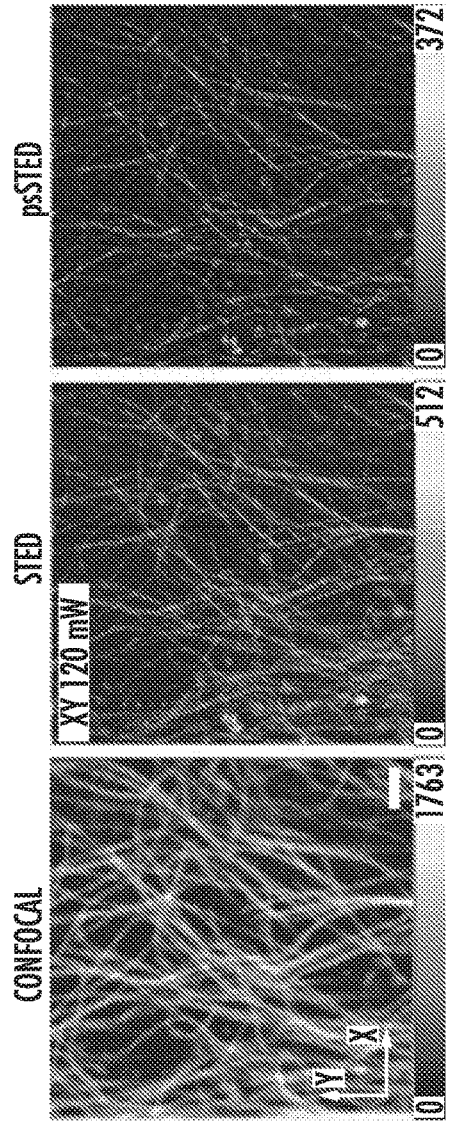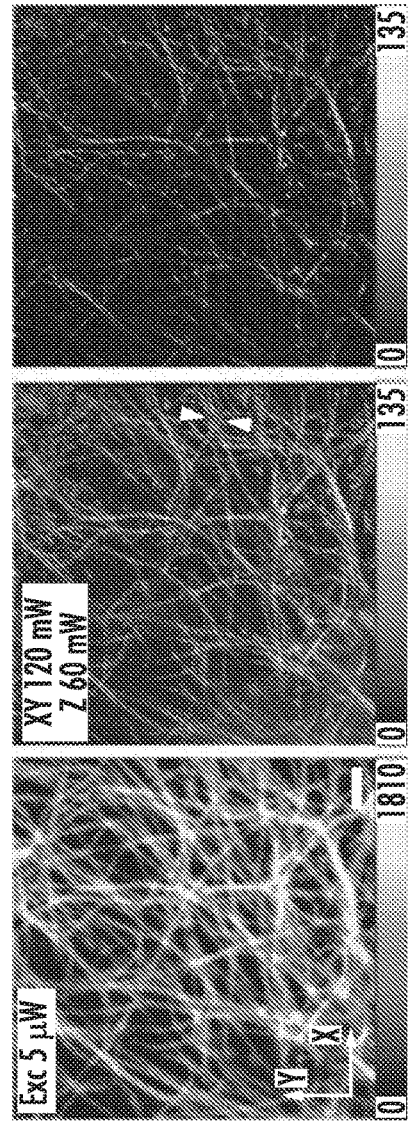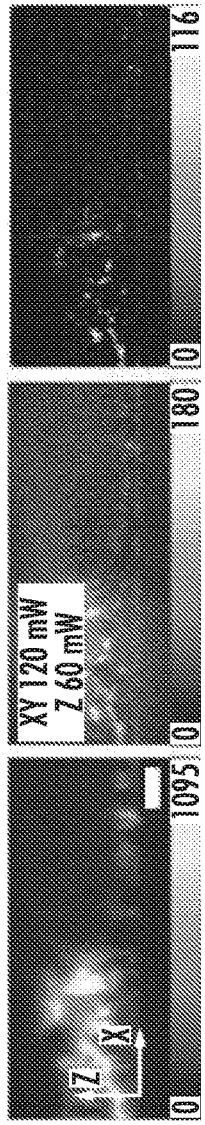
FIG. 3A
FIG. 3B
FIG. 3C

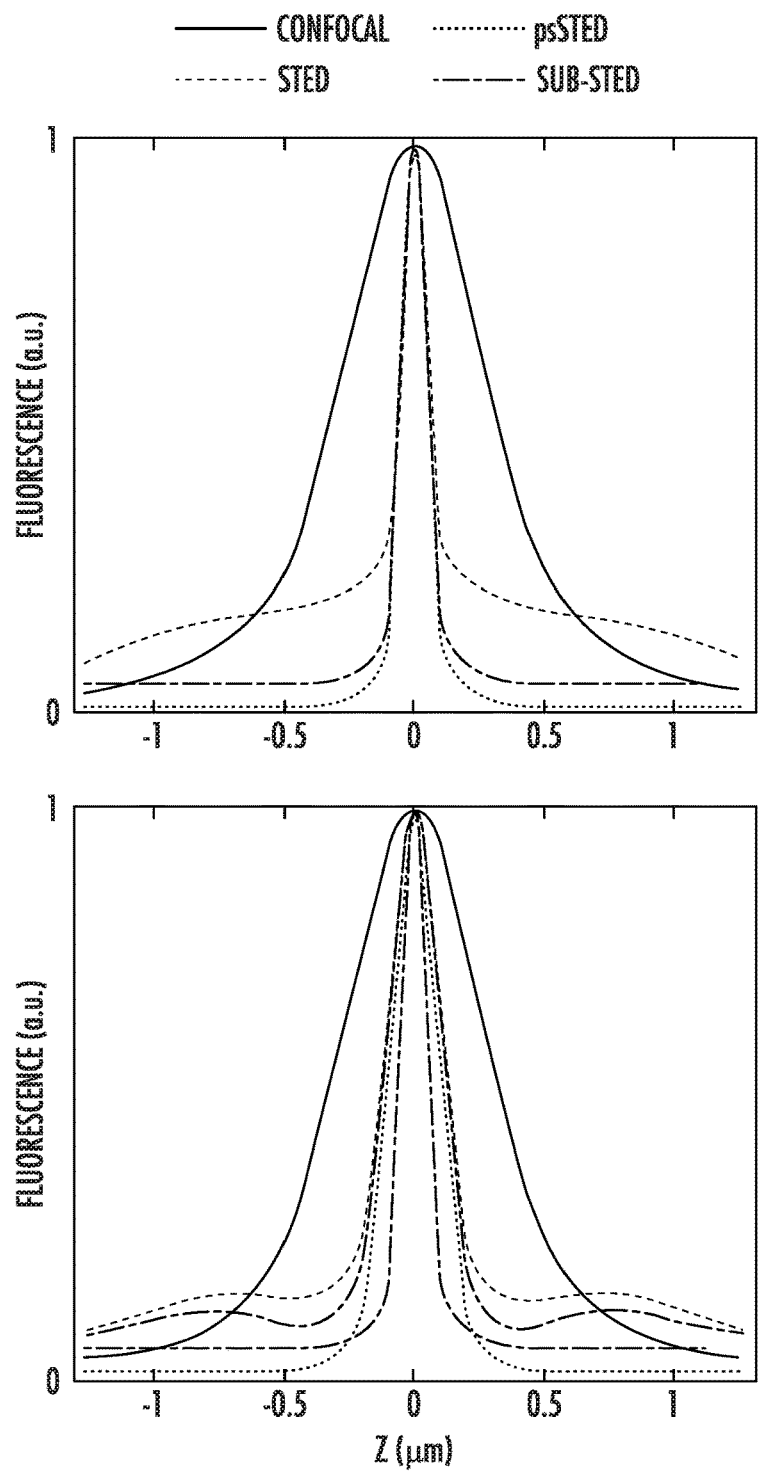
FIG. 10 CONTINUES

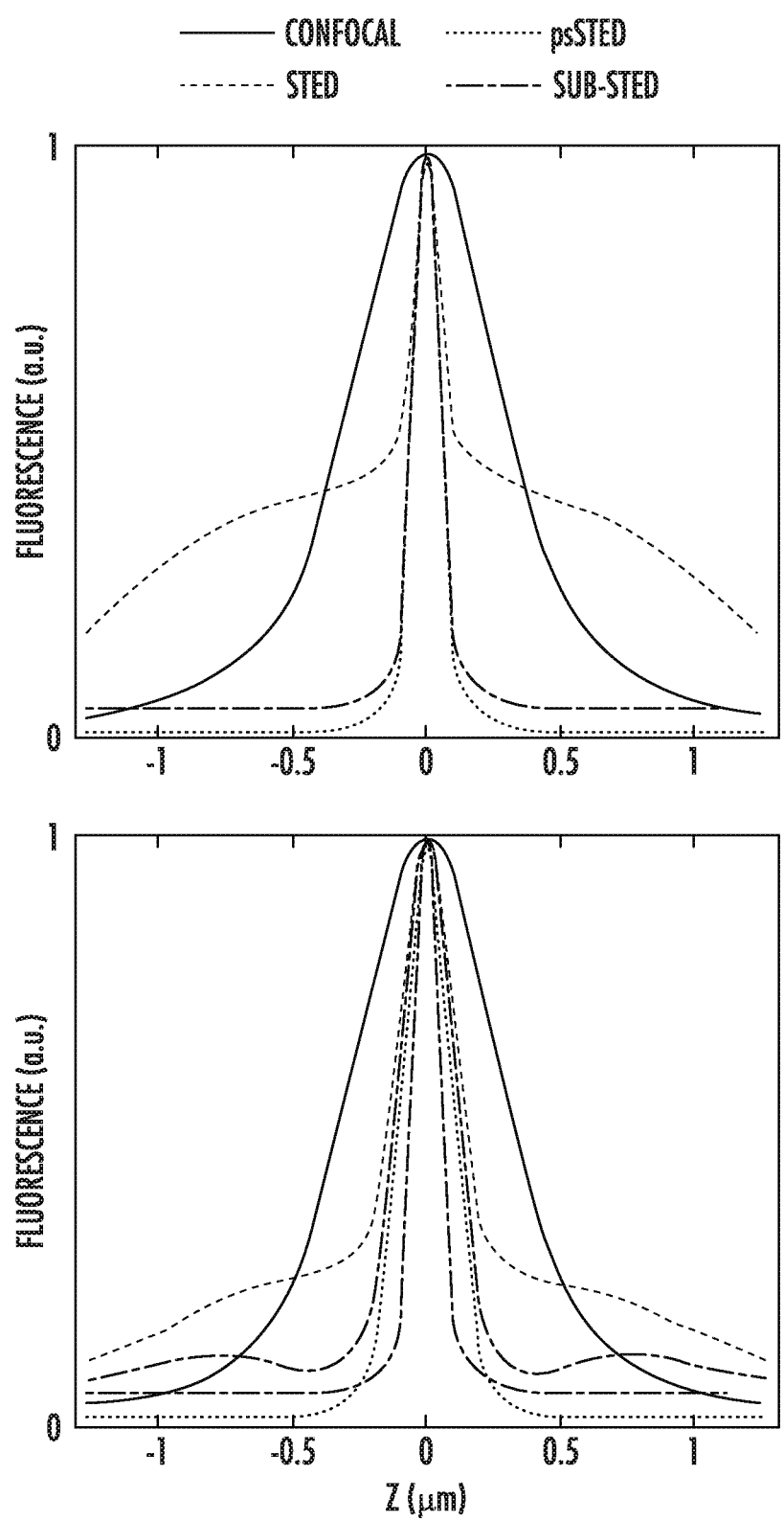
FIG. 11 CONTINUES

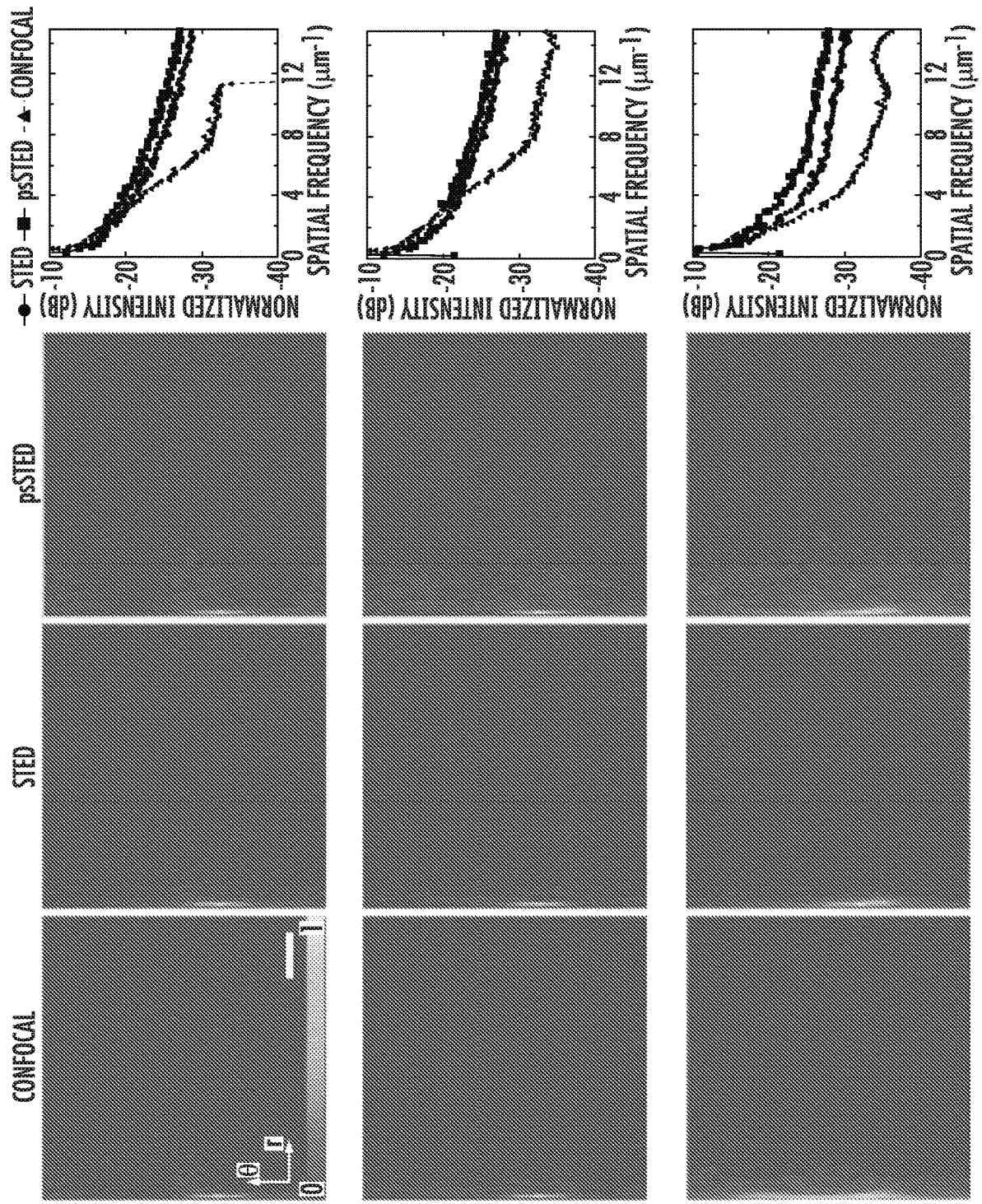

BACKGROUND-SUPPRESSED STED NANOSCOPE

CROSS-REFERENCE TO RELATED APPLICATIONS

This application is a 35 U.S.C. § 371 U.S. national entry of International Application PCT/US2020/024982 having an international filing date of Mar. 26, 2020, which claims the benefit of U.S. Provisional Application No. 62/823,713, filed Mar. 26, 2019, the content of each of the aforementioned applications is herein incorporated by reference in their entirety.

GOVERNMENT SUPPORT

This invention was made with government support under R35GM122569 awarded by the National Institutes of Health. The government has certain rights in the invention.

FIELD OF THE INVENTION

The present invention relates generally to imaging. More particularly the present invention relates to a stimulated emission depletion nanoscope and methods of stimulated emission depletion nanoscopy with background noise suppression capabilities.

BACKGROUND OF THE INVENTION

In stimulated emission depletion (STED) nanoscopy, a laser beam, called the STED beam, is wave-front modulated and shaped into a hollow spot to deplete the off-the-center fluorescence which masks details beyond optical diffraction limit. Ideally, the STED beam should only function to de-excite the molecules at the periphery of the excitation spot. However, because it is typically four to five orders of magnitude more intense than the fluorescence excitation beam, it can directly excite the fluorescent molecules. Furthermore, the relatively low intensity at the periphery of the STED spot can incompletely deplete the fluorescence, leading to off-center fluorescence leakage. Both direct excitation and incomplete depletion contribute to the low-spatial-frequency fluorescence background that can mask the high spatial frequency super-resolved fluorescence signal. Background suppression is even more critical in 3D STED implementation. The additional photon flux from the Z-STED beam introduced for axial confinement results in higher direct excitation and may further decrease the fluorescence signal due to increased residual STED intensity at the center caused by aberration, imperfect alignment, and size mismatch between the STED beam and the phase plate. The decreased signal-to-background ratio (SBR) by both decreased signal and increased background calls for an approach to suppress the background efficiently in 3D STED.

It would therefore be advantageous to provide a nanoscope with background noise suppression capabilities and methods of stimulated emission depletion nanoscopy with background noise suppression capabilities.

SUMMARY OF THE INVENTION

According to a first aspect of the present invention method of stimulated emission depletion microscopy using background suppression including generating from a stimulated emission depletion (STED) microscope a first image of a specimen having background noise. The method includes changing the polarization of a beam from the STED microscope and obtaining a second image of the background noise. Further, the method includes subtracting the second image from the first image to eliminate the background noise. The method also includes generating a final image of the specimen without the background noise.

In accordance with an aspect of the present invention, the first image is produced by using a first STED spot having a hollow core. The second image is produced by using a second STED spot having a hollow core where the hollow core is filled. The final image has enhanced clarity when compared to a reference image of a reference STED unable to produce the second image. The hollow core is filled by the components selected from the group of optical components; passive phase modulation components; active phase modulation components, or a combination thereof. The optical components are selected from a group of waveplates, electro-optic modulators, acousto-optic modulators, deformable mirrors, Faraday rotators, interferometers, and combinations thereof. The optical components are modulating the polarization of the first STED spot having a hollow core to produce the second STED spot where the hollow core is filled. The passive phase modulation components are selected from a group consisting of phase plates, wave plates, free form mirrors, interferometers, and a combination thereof. The active phase modulation components are selected from a group consisting of spatial light modulators, deformable mirrors, micro mirror arrays, and a combination thereof. Subtracting the second image from the first image is performed using methods selected from a group consisting of image by image subtraction, pixel by pixel subtraction, real-time pixel by pixel subtraction, image-based drift correction, fiducial marker-based drift correction, median filtering of the background image, smoothing of the background image, and a combination thereof. Subtracting the second image from the first image is performed using a subtraction factor. The subtraction factor is multiplied with the second image. The subtraction factor is estimated by confocal images obtained before and after STED imaging, widefield images obtained before and after STED imaging, estimated photobleaching values, total intensity of images obtained before and after STED imaging, and combinations thereof. The performance of eliminating the background noise is estimated by using methods selected from a group of: peak signal-to-background ratio (PSBR) where $$PSBR = \frac{Max - Min}{Min},$$

Max: maximum photon number in the image, Min: minimum photon number in the image; signal-to-background ratio (SBR) where $$SBR = \frac{on - fluorescence}{off - fluorescence};$$

sum of squared background photon number (SSBPN) where $SSBPN = \Sigma(BPN)^2$, BPN: background photon number; spatial frequency analysis; and combinations thereof. A non-transitory computer readable medium is used to execute the method. The specimen can take the form of a live cell, a fixed cell, a tissue, a solid-state sample, a liquid-state sample, a group of fluorescent molecules in solution, or a combination thereof. The background suppression is combined with multi-color imaging; fluorescence correlation spectroscopy, fluorescence lifetime imaging, fluorescence resonance energy transfer, correlative imaging with electron microscopy, reversible saturable optical fluorescence transitions microscopy, and combinations thereof.

In accordance with another aspect of the present invention, a system for stimulated emission depletion microscopy using background suppression includes a stimulated emission depletion (STED) microscope, wherein the STED microscope. The STED microscope is configured for producing a first image of a specimen having background noise. The microscope is also configured for changing the polarization of a beam from the STED microscope and obtaining a second image of the background noise. The system also includes a non-transitory computer readable medium programmed for subtracting the second image from the first image to eliminate the background noise and producing an image of the specimen without the background noise.

In accordance with yet another aspect of the present invention, optical components for the STED microscope are selected from a group consisting of waveplates, electro-optic modulators, acousto-optic modulators, deformable mirrors, Faraday rotators, interferometers, and combinations thereof. The optical components are modulating the polarization of the first STED spot having a hollow core to produce the second STED spot where the hollow core is filled.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and:

FIGS. 3A-3E illustrate exemplary images of a SiR-tubulin labeled 3T3 cell and associated graphical views, according to an embodiment of the present invention.

FIGS. 12A-12C illustrate image and graphical views of spatial frequency analysis of the SiR-tubulin labeled 3T3 cell images in FIGS. 3A-3C, according to an embodiment of the present invention.

DETAILED DESCRIPTION OF THE INVENTION

Figure 1A:
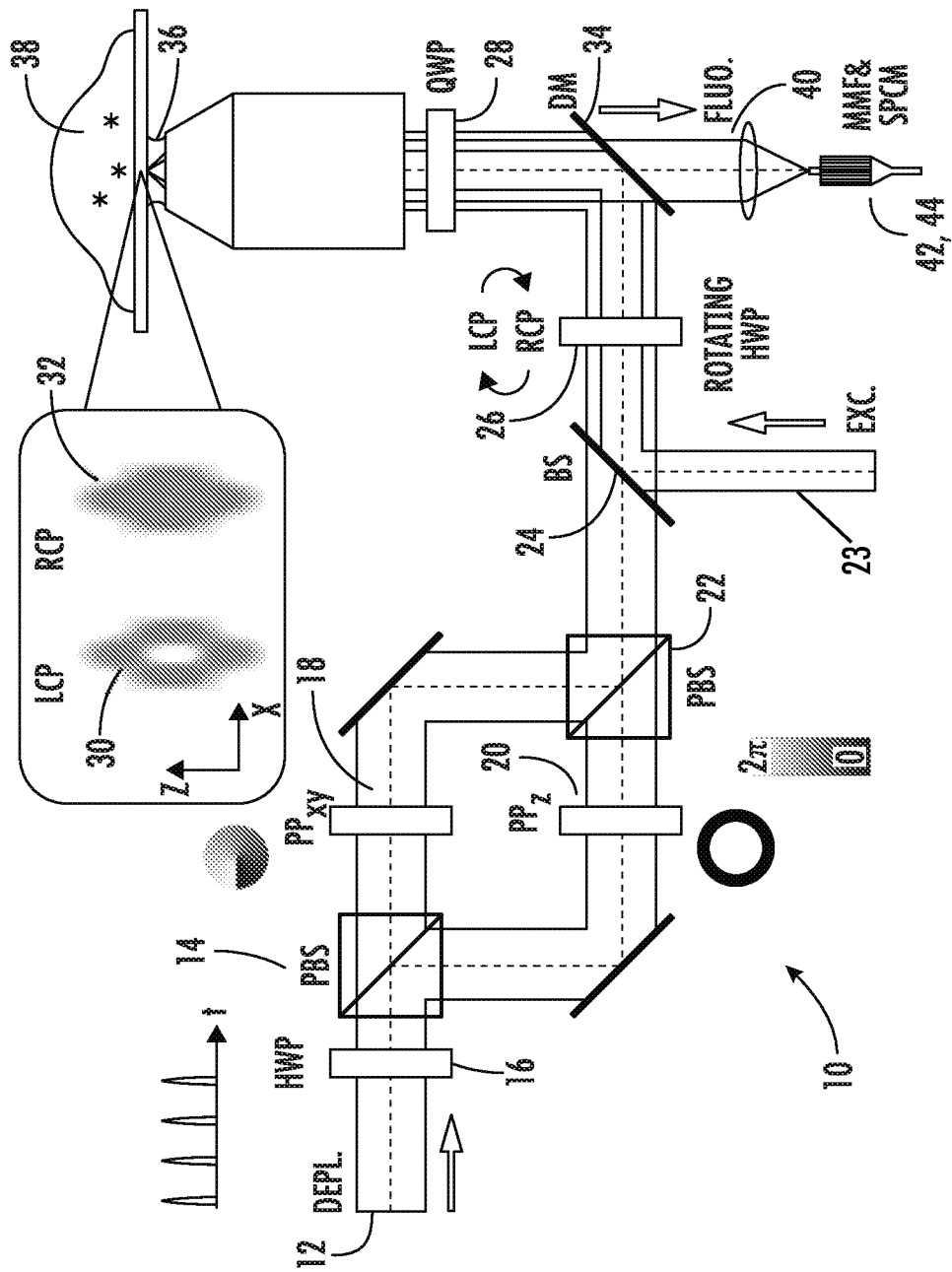
FIGS. 1A and 1B illustrate schematic diagrams of the system for STED nanoscopy and the resultant laser beam profiles, respectively, according to an embodiment of the present invention.

The presently disclosed subject matter now will be described more fully hereinafter with reference to the accompanying Drawings, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

The present invention is directed toward a system and method for STED nanography, which reduces background noise. To remove background noise from a STED image, the polarization of the STED beam is altered from that used to obtain the original image. A polarized image is obtained. This polarized image can then be subtracted from the original image to remove noise inherent to the image.

There have been several reports addressing this background noise issue. To account for the noise from direct excitation, a general category of methods called STED-only subtraction (sub-STED) has been used. In sub-STED, a background image is acquired with only the STED beam on and it is subtracted from the regular STED image. To suppress the noise coming from incomplete depletion, a method called stimulated emission double depletion (STEDD) is introduced, where a second STED pulse of Gaussian beam profile is applied to estimate the background. However, there is ambiguity in choosing the intensity of the second STED beam and the subtraction factor, which potentially raises the risk of over-subtraction of the signal. Gating the fluorescence detection time has also been used to suppress the background noise.

Figure 7:
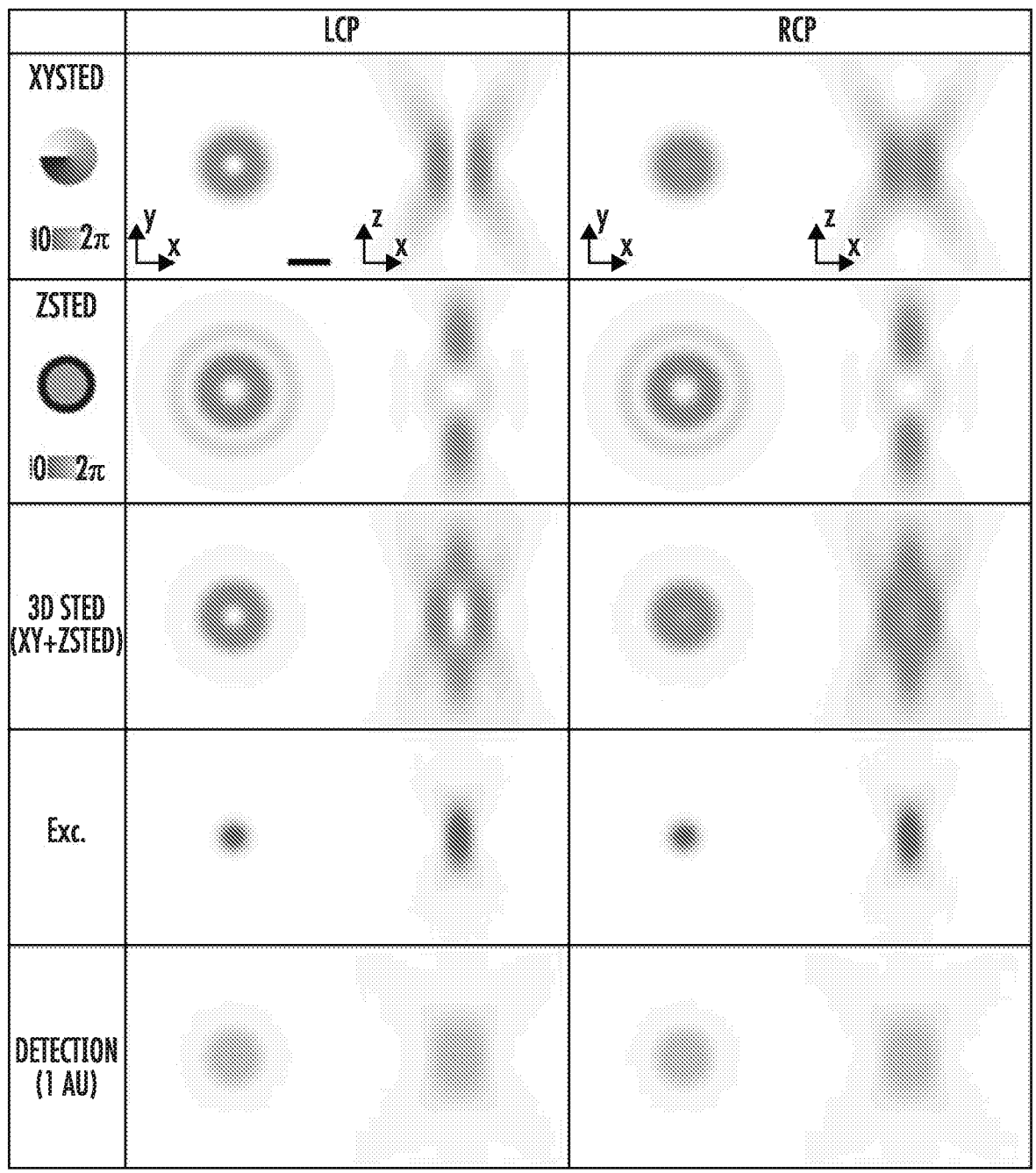
FIG. 7 illustrates a beam view of a change of PSF of XY-STED, Z-STED, 3D STED, and Excitation under polarization 25 switching from LCP to RCP. The scale bar for FIG. 7 is 500 nm.
Figure 8:
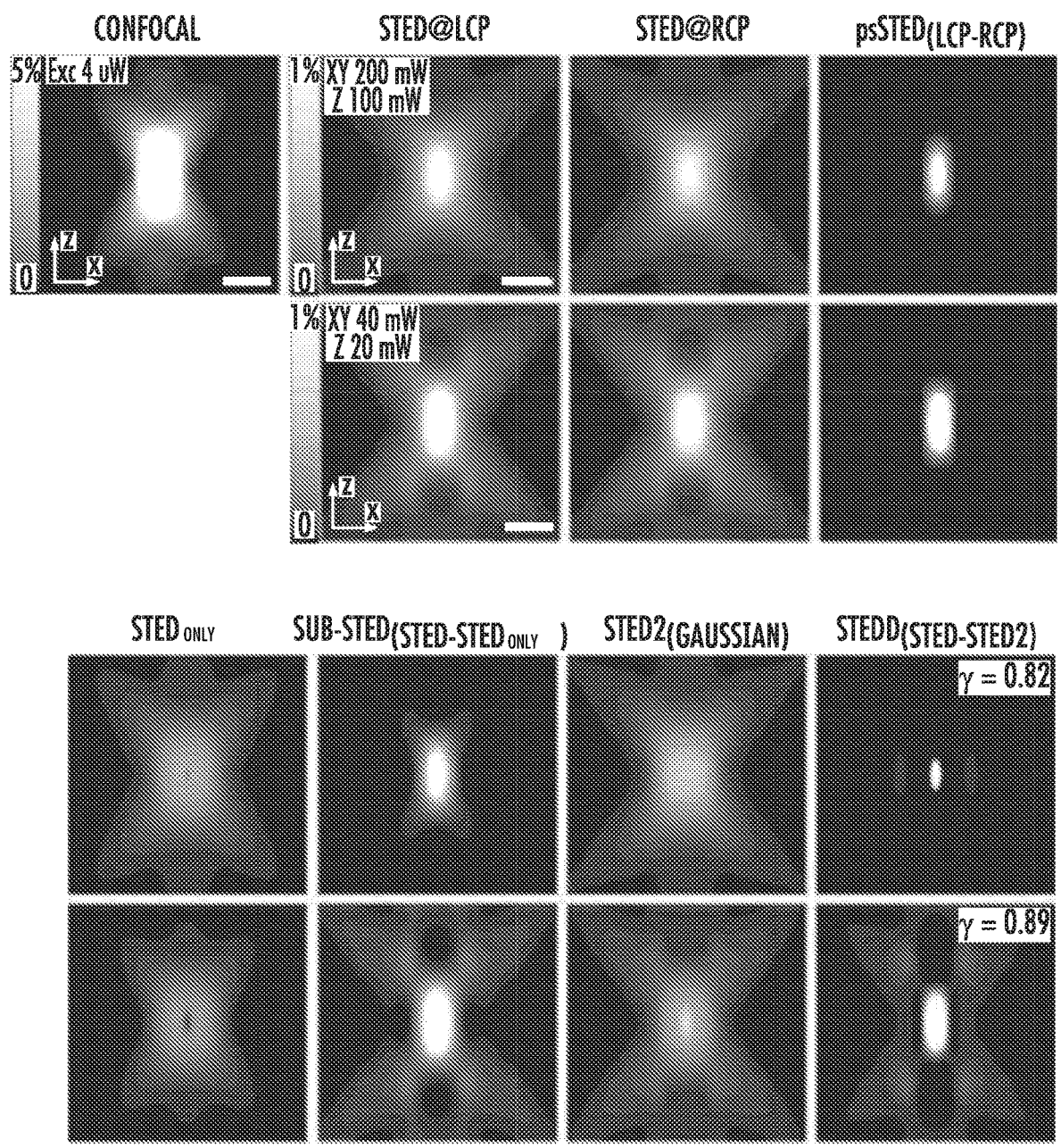
FIG. 8 illustrates image views of a simulation of detected fluorescence signal from a point fluorophore, i.e. PSF, according to an embodiment of the present invention.

In the present invention, polarization switching STED (psSTED) can efficiently suppress the low spatial frequency background appearing in STED images. In psSTED, the STED beam polarization switches between two different circularly polarized states to record a regular STED image and a background noise image sequentially. A straightforward, unambiguous subtraction process between these two images provides a background-free, super-resolved image. psSTED can be used for both the high STED power regime where the background due to direct excitation by STED beam is strong and the low STED power regime where the background noise is mostly due to incomplete depletion. Comparison of the background suppression performance of psSTED with the sub-STED, time-gated detection (g-STED) and STED highlights its capability of efficient background suppression with a simple hardware implementation.

psSTED makes use of the fact that the STED spot generated by phase modulation is also polarization dependent. Suppose that a counter-clockwise vortex phase plate is used for generating the XY-STED spot. Only when the STED beam is left-handed circularly polarized (LCP) is there a donut spot with a theoretically predicted zero-intensity center. By comparison, for a right-handed circularly polarized (RCP) beam, the longitudinal component of the electric field constructively interferes at the center and fills the hollow center of the STED donut, rather than destructively interfering as in an LCP beam, as illustrated in FIG. 7. Combined with the unaffected Z-STED spot, the RCP STED beam will be focused into a 3D pattern that has almost the same exterior contour as the regular 3D STED hollow profile while the center is filled. This RCP STED spot depletes the fluorescence signal at the center, and only the background fluorescence, due to either incomplete depletion or excitation by the STED beam, is detected, as illustrated in FIG. 1B. The image recorded when both the fluorescence excitation and RCP STED beams are turned on is an accurate estimation of the background and can be subtracted from the regular STED image (obtained using the LCP STED beam), resulting in a background-free super-resolved image, as illustrated in FIG. 1B, FIG. 4, and FIG. 8.

Figure 1B:
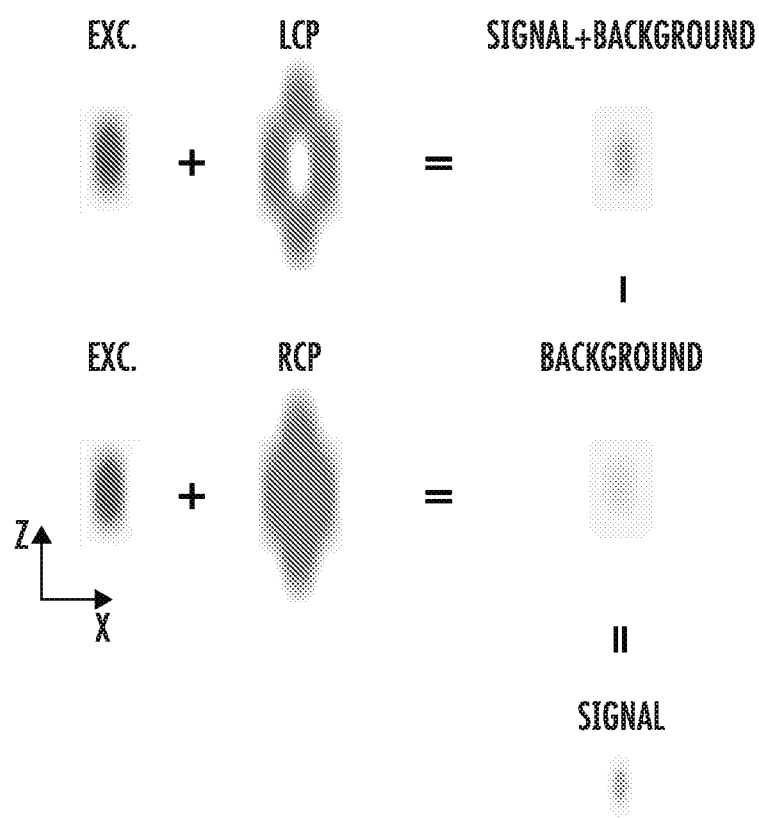

FIGS. 1A and 1B illustrate schematic diagrams of the system for STED nanoscopy and the resultant laser beam profiles, respectively. As illustrated in FIG. 1A, the system 10 includes a depletion laser 12. The depletion laser 12 is launched and split at a first polarizing beam splitter (first PBS) 14 where the split ratio is tuned by a first half-wave plate (first HWP) 16. Two phase plates, $PP_{xy}$ 18 and $PP_z$ 20, generate XY- and Z-STED profiles at the objective lens focus, respectively. The depletion laser 12 is then combined at a second PBS 22 and combined with excitation beam 23 at the 70:30 beam splitter (BS) 24. A second HWP 26 and quarter-wave plate (QWP) 28 are used to precisely align the polarization to left-circular polarization (LCP). Polarization switching takes place at the second HWP 28, such that LCP is modulated to right-circular polarization (RCP) by a motorized rotation stage. As shown in the inset, the 3D STED spatial profile of RCP 30 has filled center compared with that of LCP 32. STED and excitation laser is reflected at a dichroic mirror (DM) 34 and enters the objective lens 36 to illuminate certain focal volume at the specimen 38. The fluorescence from the specimen 38 is spectrally filtered by the DM 34 and additional filters (not shown in figure) for detection. Finally, the fluorescence 40 is focused to the tip of a multi-mode fiber (MMF) 42 which acts as a pinhole of size 62.5 um and delivers photons to single-photon counting module (SPCM) 44.

As illustrated in FIG. 1B, when LCP is used for the depletion laser, the image records a signal and background like conventional STED. When polarization is changed to RCP, the signal at the center is also depleted and the image records the background noise. By subtracting the two images, background-free, psSTED is achieved.

Figure 2:
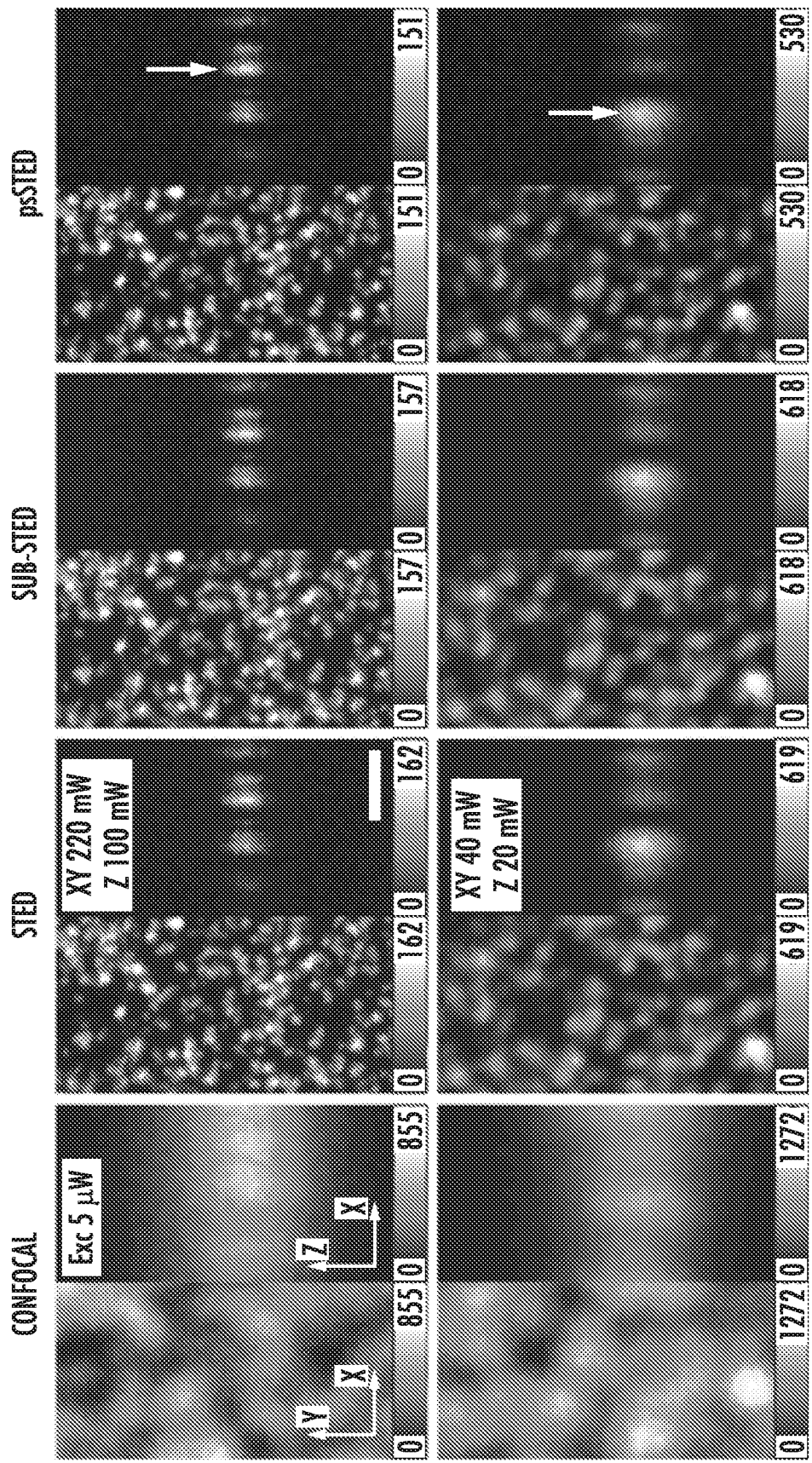
FIG. 2 illustrates exemplary image views of fluorescent beads, according to an embodiment of the present invention.

FIG. 2 illustrates exemplary image views of fluorescent beads, according to an embodiment of the present invention. The beads are localized in an XY plane of the imaging volume. Two STED power conditions are used: high power (XY STED: 220 mW, Z STED: 100 mW, top) and low power (XY STED: 40 mW, Z STED: 20 mW, bottom). XY and XZ cross-sections of the bead sample images are shown in all conditions. The cross-section of a bead along a z axis is shown on the right: with high power on the top and low power on the bottom.

Figure 3D:
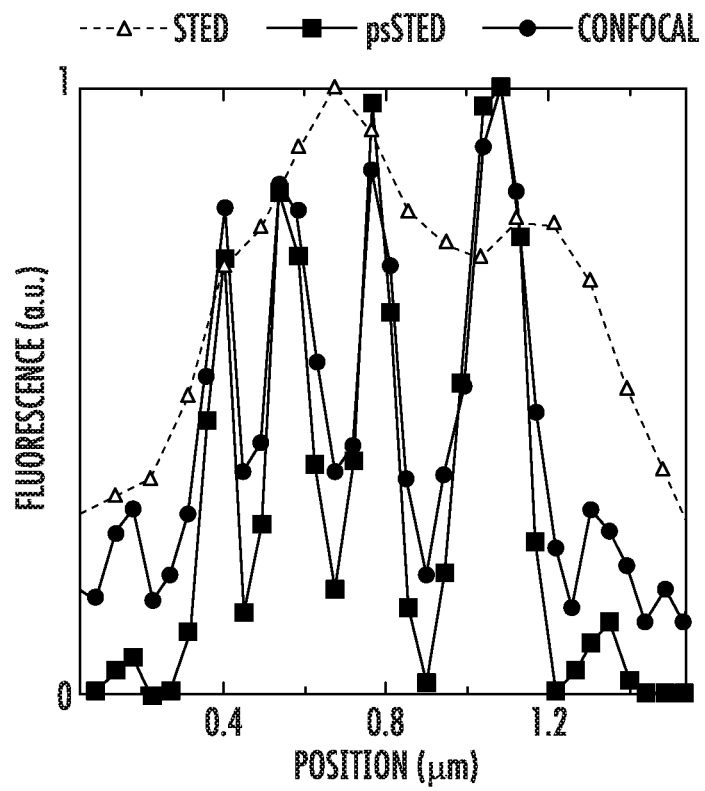
Figure 3E:
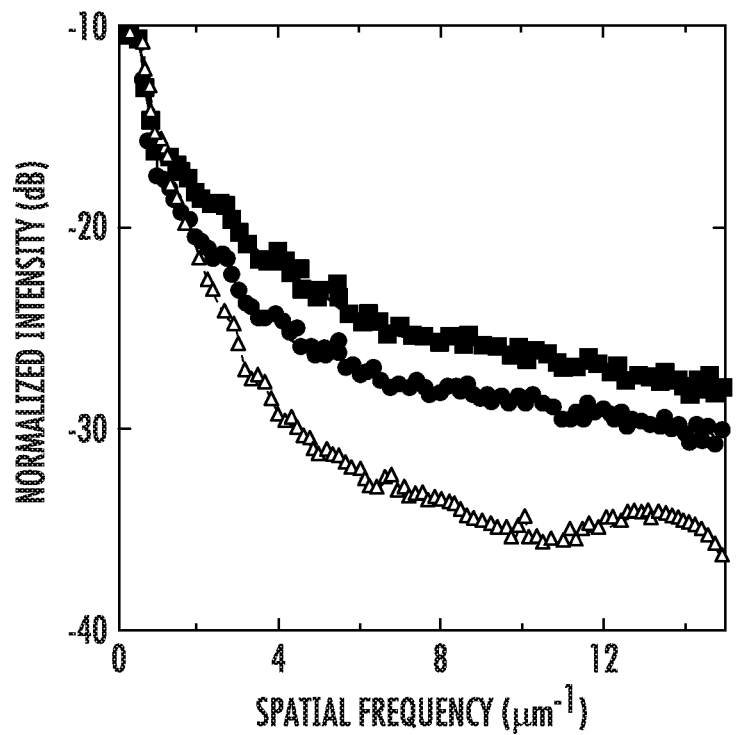

FIGS. 3A-3E illustrate exemplary images of a SiR-tubulin labeled 3T3 cell and associated graphical views, according to an embodiment of the present invention. The scale bar for these images is 2 μm. FIG. 3A illustrates a 2D STED image, where an XY-STED beam alone is applied. $\gamma=1.00$. FIG. 3B illustrates a 3D STED image, where XY STED and Z STED beams were applied. $\gamma=1.00$. FIG. 3C illustrates a 3D STED image of an XZ cross-section of the 3T3 cell. $\gamma=1.51$. FIG. 3D illustrates graphical view of a cross-section of microtubule filaments (white arrow) in FIG. 3B. FIG. 3E illustrates a graphical view of a spatial frequency analysis of the images in FIG. 3C. Further detailed analysis is provided, herein, below.

Figure 4A:
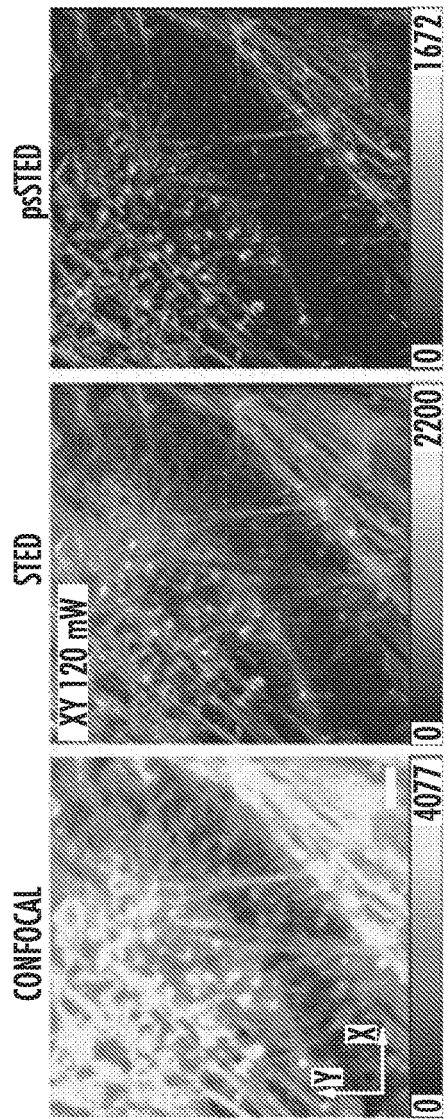
FIGS. 4A-4E illustrate exemplary images of a SiR-actin labeled LN229 cell and associated graphical views, according to an embodiment of the present invention.
Figure 4B:
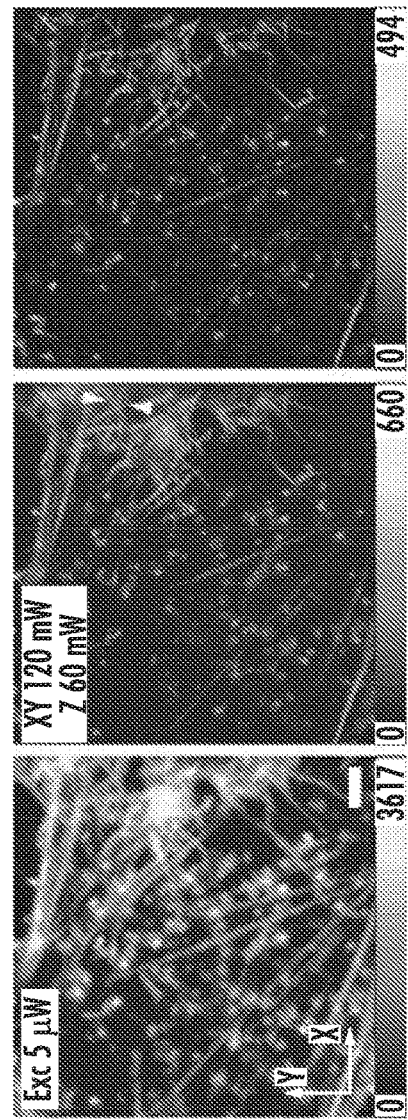
Figure 4C:
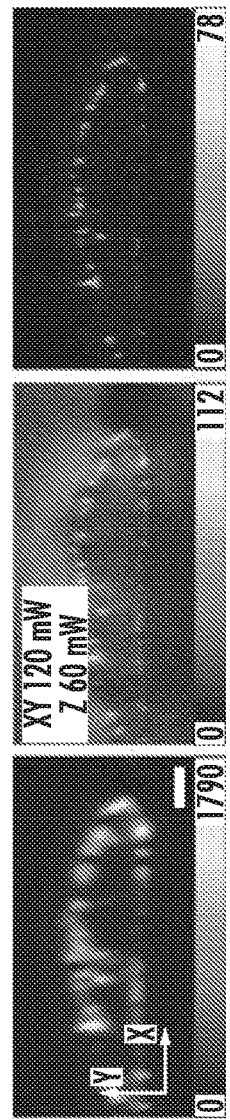
Figure 4D:
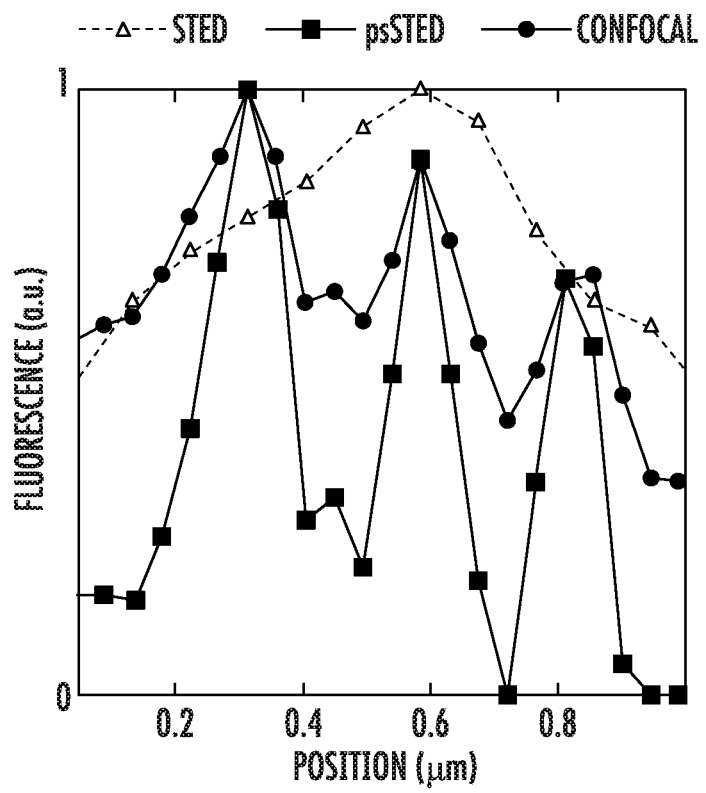
Figure 4E:
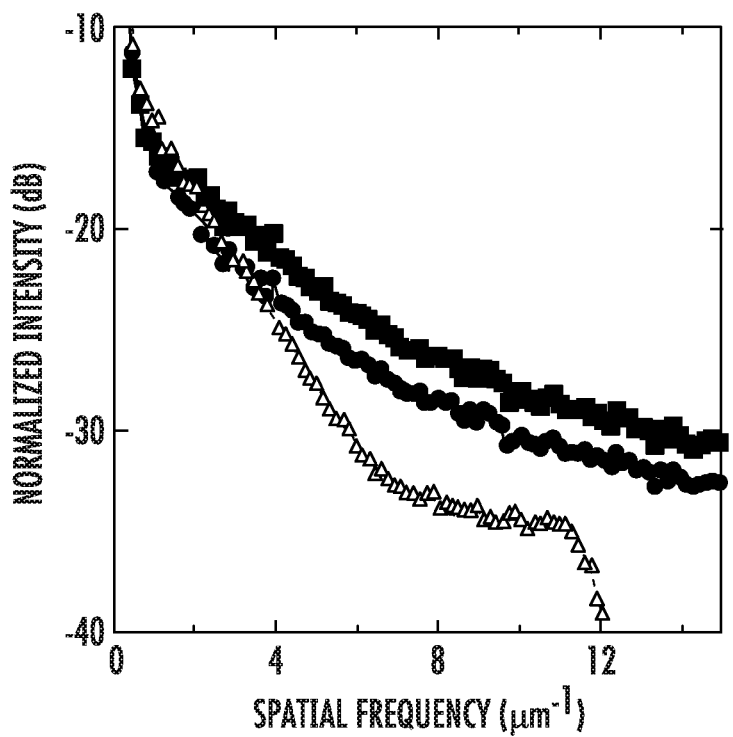

FIGS. 4A-4E illustrate exemplary images of a SiR-actin labeled LN229 cell and associated graphical views, according to an embodiment of the present invention. The scale bar for these images is 2 μm. FIG. 4A illustrates a 2D STED image, where an XY-STED beam alone is applied. $\gamma=1.21$. FIG. 4B illustrates a 3D STED image, where XY STED and Z STED beams were applied. $\gamma=1.46$. FIG. 4C illustrates a 3D STED image with an XZ cross-section of the LN229 cell. $\gamma=2.25$. FIG. 4D illustrates a graphical view of a cross-section of actin filaments (white arrow) in FIG. 4B. FIG. 4E illustrates a graphical view of a spatial frequency analysis of the images in FIG. 4C. Further detailed analysis is provided, herein, below.

Figure 5A:
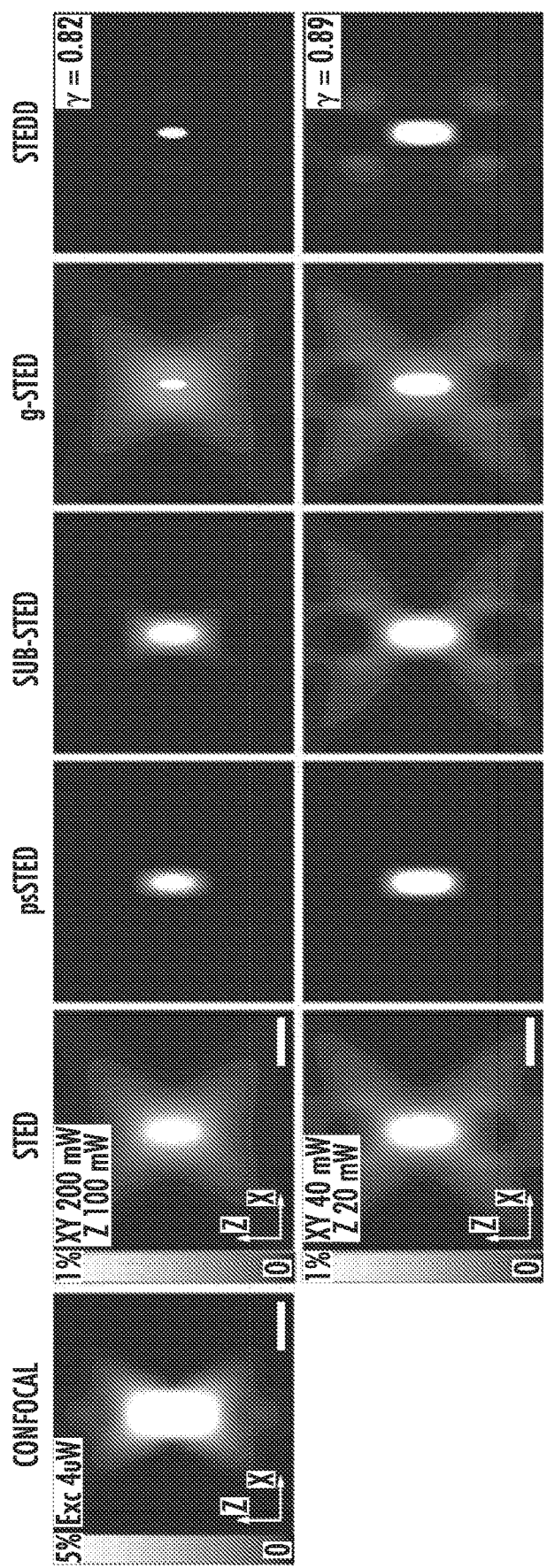
FIGS. 5A-5E illustrate image and graphical views of a comparison of psSTED performance with other background suppression methods: STEDD, sub-STED and g-STED.
Figure 5B:
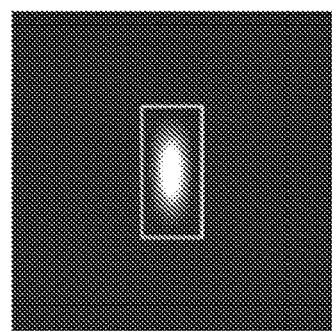
Figure 5C:
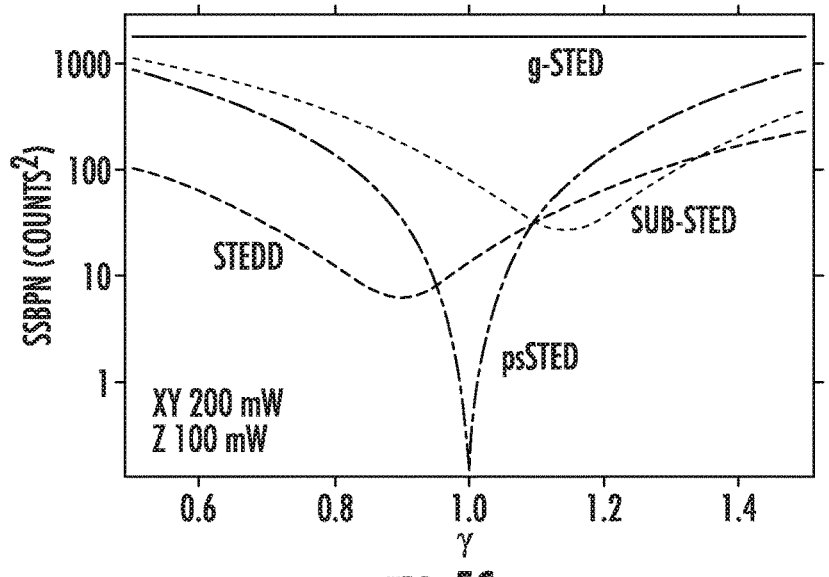
Figure 5D:
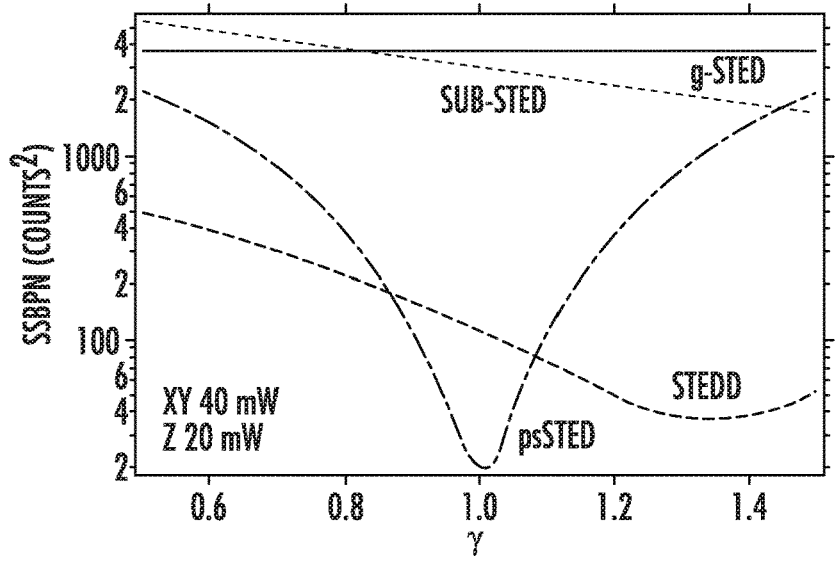
Figure 5E:
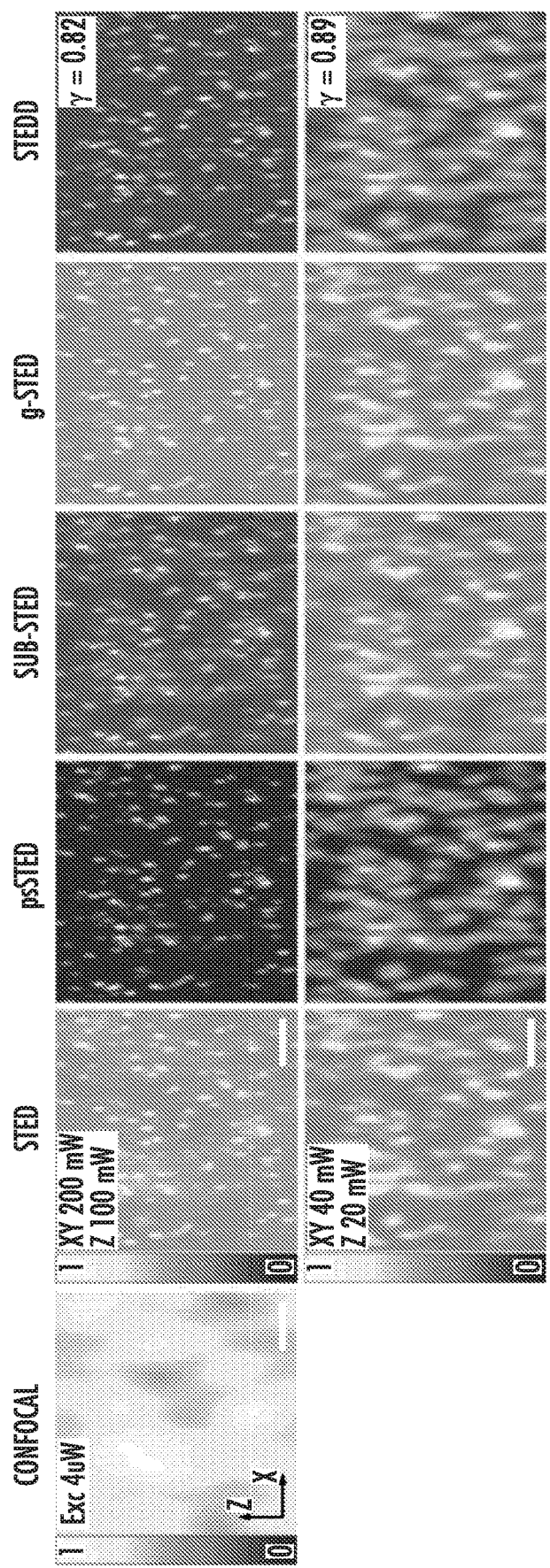

FIGS. 5A-5E illustrate image and graphical views of a comparison of psSTED performance with other background suppression methods: STEDD, sub-STED and g-STED. FIG. 5A illustrates an image comparison of effective point spread function (PSF). The fluorescence intensity is calculated by assuming a point fluorophore, quantum yield of excitation=0.65, pulse period=12.5 ns, dwelling time=400 SPCM efficiency=0.9. The number in color map represents the percent intensity normalized to the maximum intensity across the PSF. The intensity higher than the highest value in the color map appears as white. Scale bar: 500 nm. FIG. 5B illustrates the mean squared background photon number (SSBPN) calculated from the images from FIG. 5A except for the center area to exclude signal fluorescence photons. The area excluded in SSBPN calculation is shown in light grey. SSBPN as a function of subtraction factor γ at high STED power in the graphical view of FIG. 5C and low STED power, as illustrated in the graphical view of FIG. 5D. FIG. 5E illustrates an image view comparison of simulated fluorescent beads. Simulation of 30,000 fluorescent beads are randomly scattered in 2.56×2.56×2.56 μm space. The color map is normalized to the maximum intensity of each image. The scale bar for these images is 500 nm.

Figure 6:
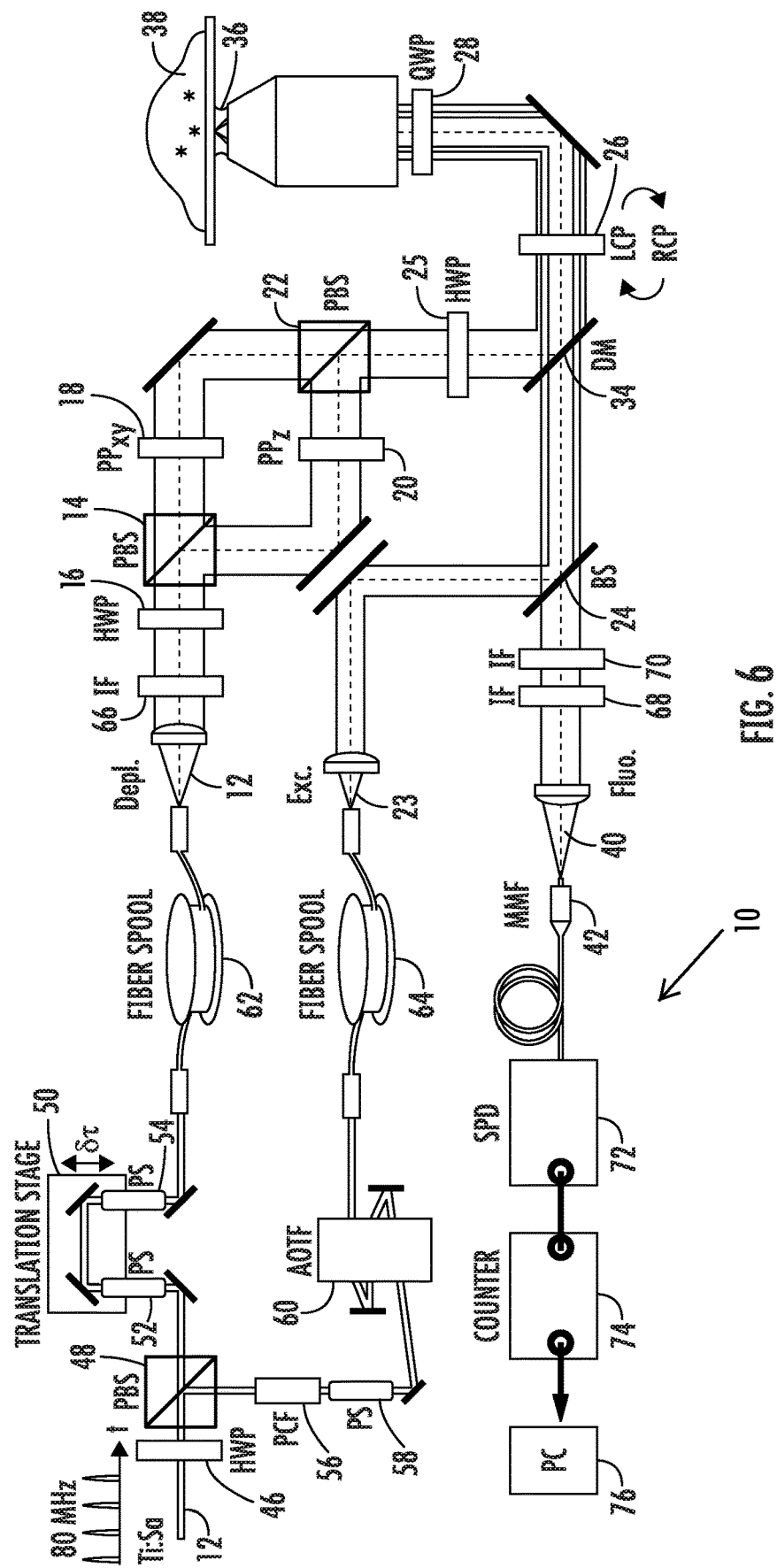
FIG. 6 illustrates a schematic view of a system for STED nanography, according to an embodiment of the present invention.

FIG. 6 illustrates a schematic view of a system for STED nanography, according to an embodiment of the present invention. FIG. 6 illustrates a more detailed schematic view of the system 10 illustrated in FIG. 1A. FIG. 6 shows additional preprocessing steps and componentry for the depletion laser 12 and the excitation laser 23. The depletion laser 12 is preprocessed via a preprocessing HWP 46 and preprocessing PBS 48. The preprocessing PBS 48 splits the beam and directs the depletion beam 12 to a translation stage 50 having first and second pulse stretchers (PS) 52, 54. The other portion of the beam is directed to a photonic crystal fiber (PCF) 56 and a third PS 58. After the third PS 58, the beam passes through an acousto-optic tunable filter (AOTF) 60. The split beams enter first and second fiber spools 62, 64. The beams emerge from the fiber spools 62, 64 as the depletion laser 12 and the excitation laser 23.

The depletion laser 12 is launched and split at a first polarizing beam splitter (first PBS) 14 where the split ratio is tuned by a first half-wave plate (first HWP) 16 and an interference filter (IF) 66. Two phase plates, $PP_{xy}$ 18 and $PP_z$ 20, generate XY- and Z-STED profiles at the objective lens focus, respectively. The depletion laser 12 is then combined at a second PBS 22 and combined with excitation beam 23 at the 70:30 beam splitter (BS) 24. The depletion laser 12 is then passed through a post-PBS HWP 25. A second HWP 26 and quarter-wave plate (QWP) 28 are used to precisely align the polarization to left-circular polarization (LCP). Polarization switching takes place at the second HWP 26, such that LCP is modulated to right-circular polarization (RCP) by a motorized rotation stage. The STED and excitation laser 23 is reflected at a dichroic mirror (DM) 34 and enters the objective lens 36 to illuminate certain focal volume at the specimen 38. The fluorescence 40 from the specimen 38 is spectrally filtered by the DM 34 and by a pair of IFs 68, 70. Finally, the fluorescence 40 is focused to the tip of a multi-mode fiber (MMF) 42 which acts as a pinhole of size 62.5 um and delivers photons to a single photon detector (SPD) 72. The information from the SPD 72 is processed by a counter 74 and a PC 76.

FIG. 7 illustrates a beam view of a change of PSF of XY-STED, Z-STED, 3D STED, and excitation under polarization 25 switching from LCP to RCP. The scale bar for FIG. 7 is 500 nm.

FIG. 8 illustrates image views of a simulation of detected fluorescence signal from a point fluorophore, i.e. PSF, according to an embodiment of the present invention. The 32 fluorescence intensity is calculated by assuming a point fluorophore, quantum yield of 33 excitation=0.65, pulse period=1.25 ns, dwelling time=400 μs, SPCM efficiency=0.9. The 34 number in the color map represents the percent intensity normalized to the maximum intensity 35 across the PSF. Note that STED@RCP and STED only PSF are normalized to STED@LCP and not 36 by themselves to avoid misleading interpretation. Equivalently, STED2 PSF is normalized to the 37 PSF with first STED pulse (STED1 PSF)1 not by itself. The intensity higher than the highest value 38 in the color map appears to be white color. The scale bar for FIG. 8 is 500 nm.

Figure 9:
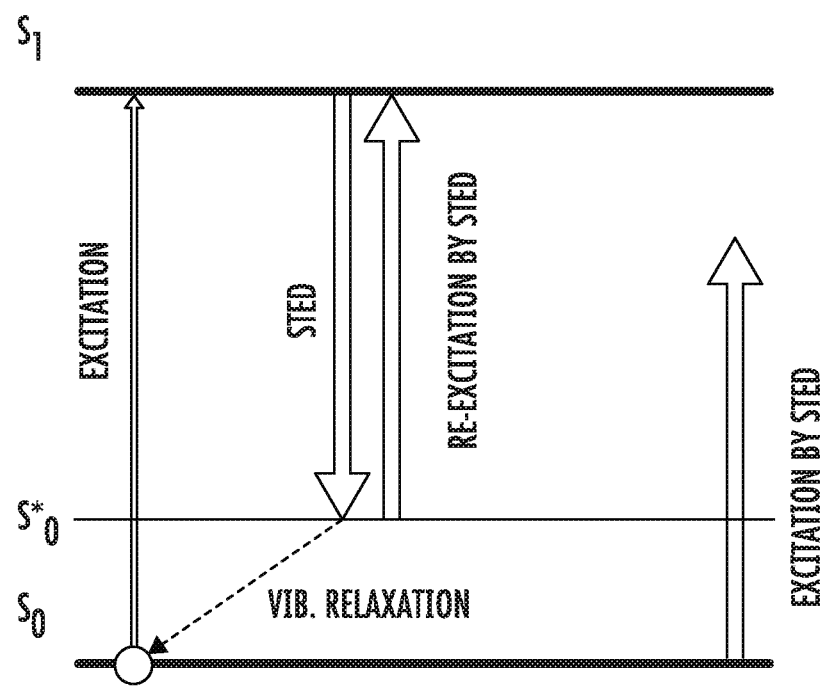
FIG. 9 illustrates a schematic view of a simplified energy-level diagram of a fluorophore in STED nanoscopy.
Figure 10:
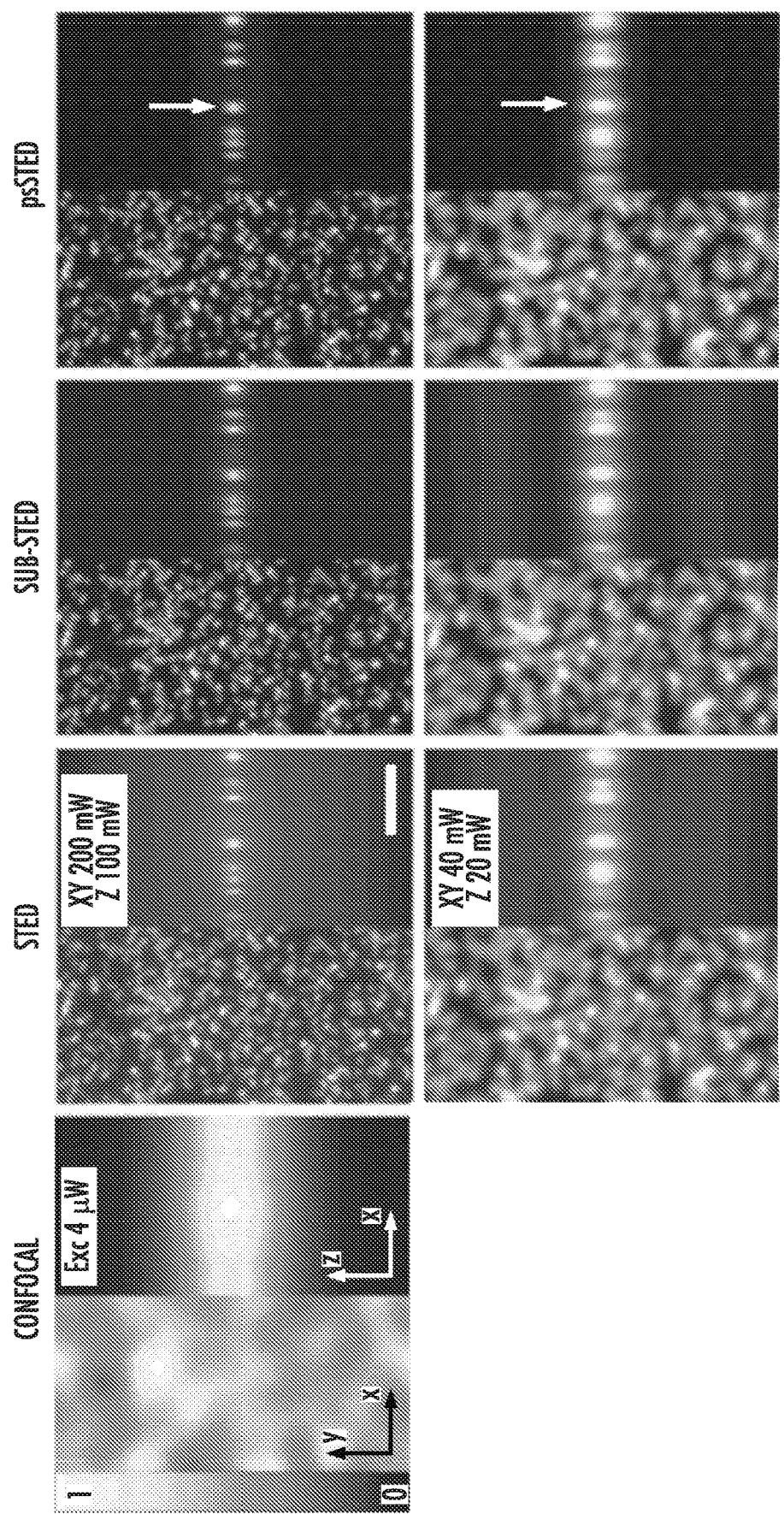
FIG. 10 illustrates image and graphical views of a simulation of fluorescent beads when excitation laser power is 4 µW. The scale Bar for FIG. 10 is 500 nm.
Figure 11:
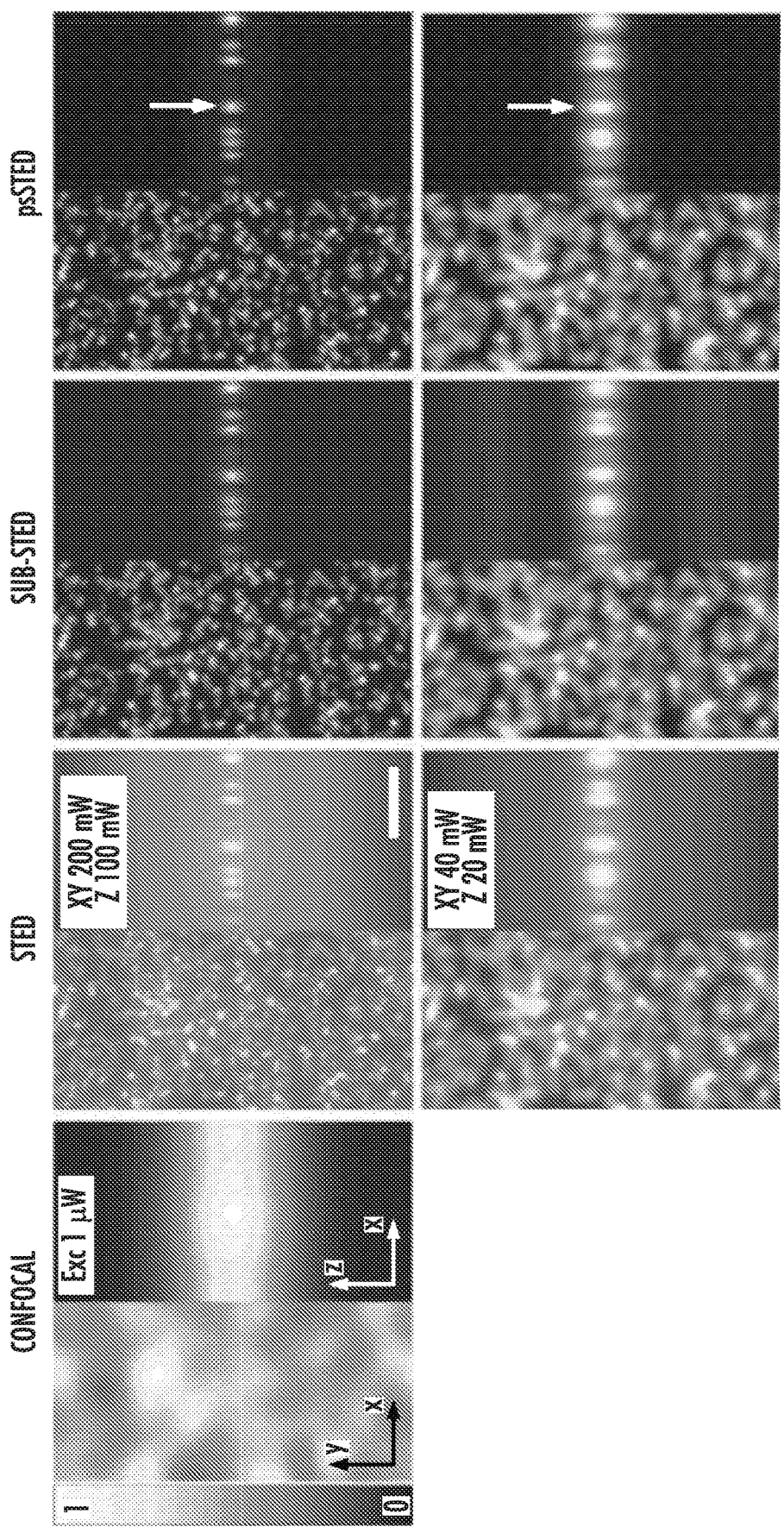
FIG. 11 illustrates a simulation of fluorescent beads when excitation laser power is 1 µM. The scale bar for FIG. 11 is 500 nm.

FIG. 9 illustrates a schematic view of a simplified energy-level diagram of a fluorophore in STED nanoscopy. FIG. 10 illustrates image and graphical views of a simulation of fluorescent beads when excitation laser power is 4 μW. The scale Bar for FIG. 10 is 500 nm. FIG. 11 illustrates a simulation of fluorescent beads when excitation laser power is 1 μW. The scale bar for FIG. 11 is 500 nm.

FIGS. 12A-12C illustrate image and graphical views of spatial frequency analysis of the SiR-tubulin labeled 3T3 cell images in FIGS. 3A-3C, according to an embodiment of the present invention. The Fourier transformed image is shown in polar coordinates. FIG. 12A provides a Fourier analysis of FIGS. 3A and 3B. FIG. 12B provides a Fourier analysis of FIGS. 3B and 3C and FIG. 12C provides a Fourier analysis of FIG. 3C. The scale bar for FIGS. 12A-12C is 2.5 $\mu m^{-1}$. The intensity as a function of spatial frequency, where the intensity is integrated over angular (θ) coordinate, is shown on the right.

Figures 13A, 13B, 13C:
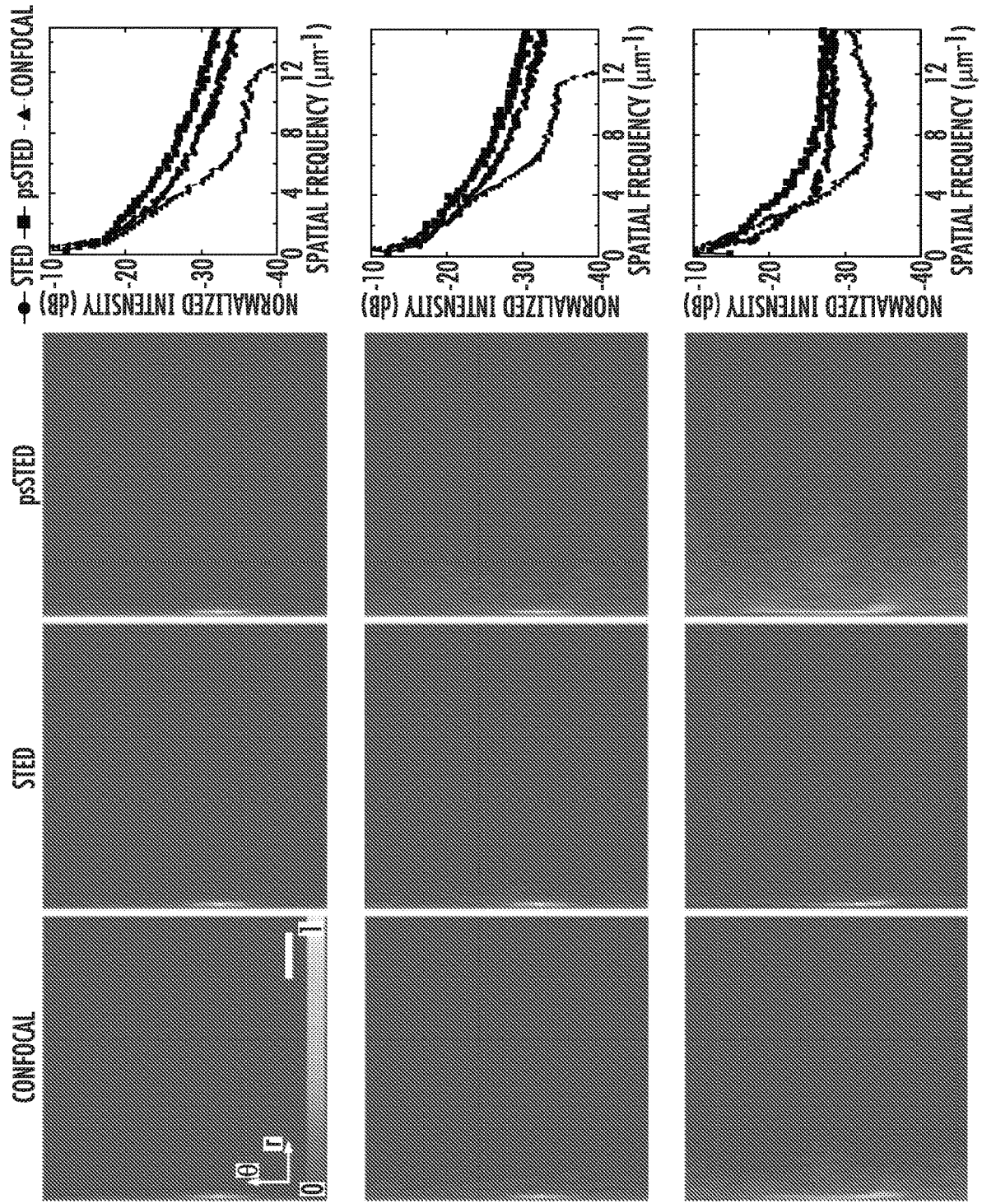
FIGS. 13A-13C illustrate image and graphical views of spatial frequency analysis of the SiR-actin labeled LN229 cell images in FIGS. 4A-4C, according to an embodiment of the present invention.

FIGS. 13A-13C illustrate image and graphical views of spatial frequency analysis of the SiR-actin labeled LN229 cell images in FIGS. 4A-4C, according to an embodiment of the present invention. The Fourier transformed image is shown in polar coordinates. FIG. 13A provides a Fourier analysis of FIGS. 4A and 4B. FIG. 13B provides a Fourier analysis of FIGS. 4B and 4C and FIG. 13C provides a Fourier analysis of FIG. 4C. The scale bar for FIGS. 12A-12C is 2.5 $um^{-1}$. The intensity as a function of spatial frequency, where the intensity is integrated over angular (θ) coordinate, is shown on the right.

Figure 14:
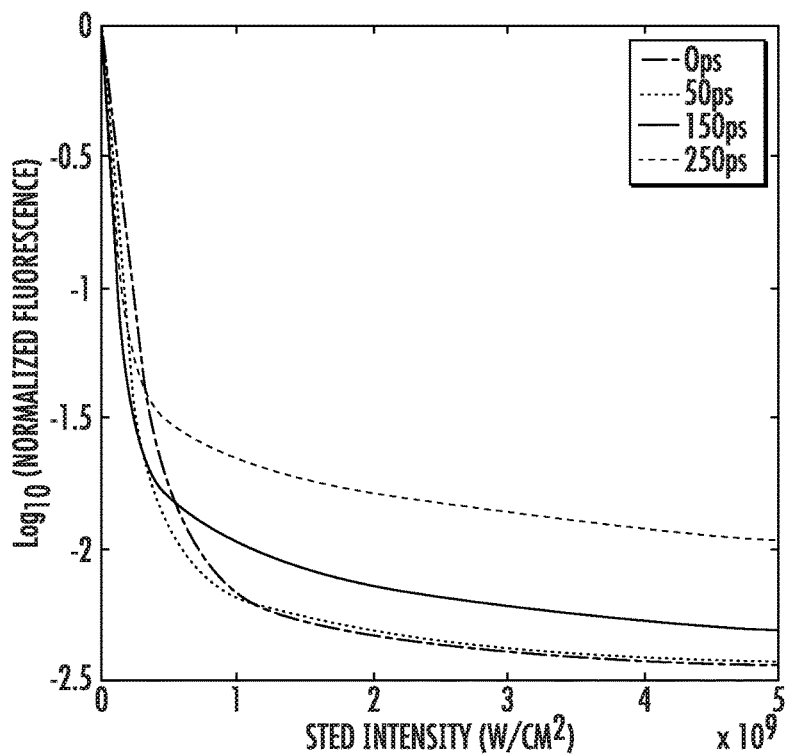
FIG. 14 illustrates a graphical view of an optimization on the pulse delay from the excitation to the STED pulse, according to an embodiment of the present invention.

FIG. 14 illustrates a graphical view of an optimization on the pulse delay from the excitation to the STED pulse, according to an embodiment of the present invention. The variance of the normalized detected fluorescence as a function of the STED intensity with different pulse delay is shown. $t_d$=150 ps provides a good compromise between the depletion efficiency and residue fluorescence, and was applied throughout.

Figure 15:
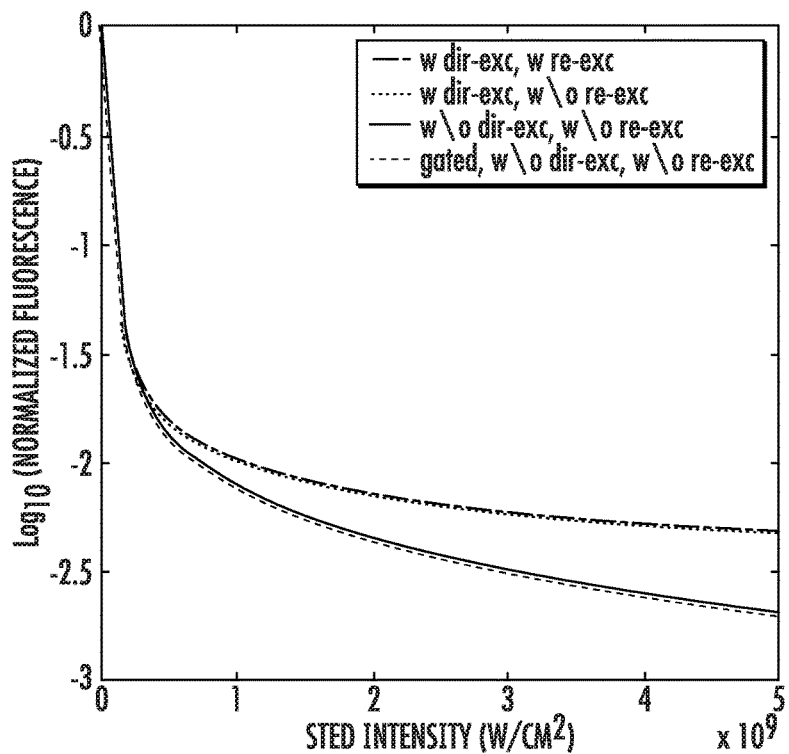
FIG. 15 illustrates a graphical view of a comparison of the background caused by STED direct excitation and STED re-excitation.

FIG. 15 illustrates a graphical view of a comparison of the background caused by STED direct excitation and STED re-excitation. When a relatively long STED pulse is used (>100 ps), the difference of the fluorescence with or without STED re-excitation is so small compared with the effect caused by STED direct excitation. Thus, the STED re-excitation process is negligible.

Figure 16:
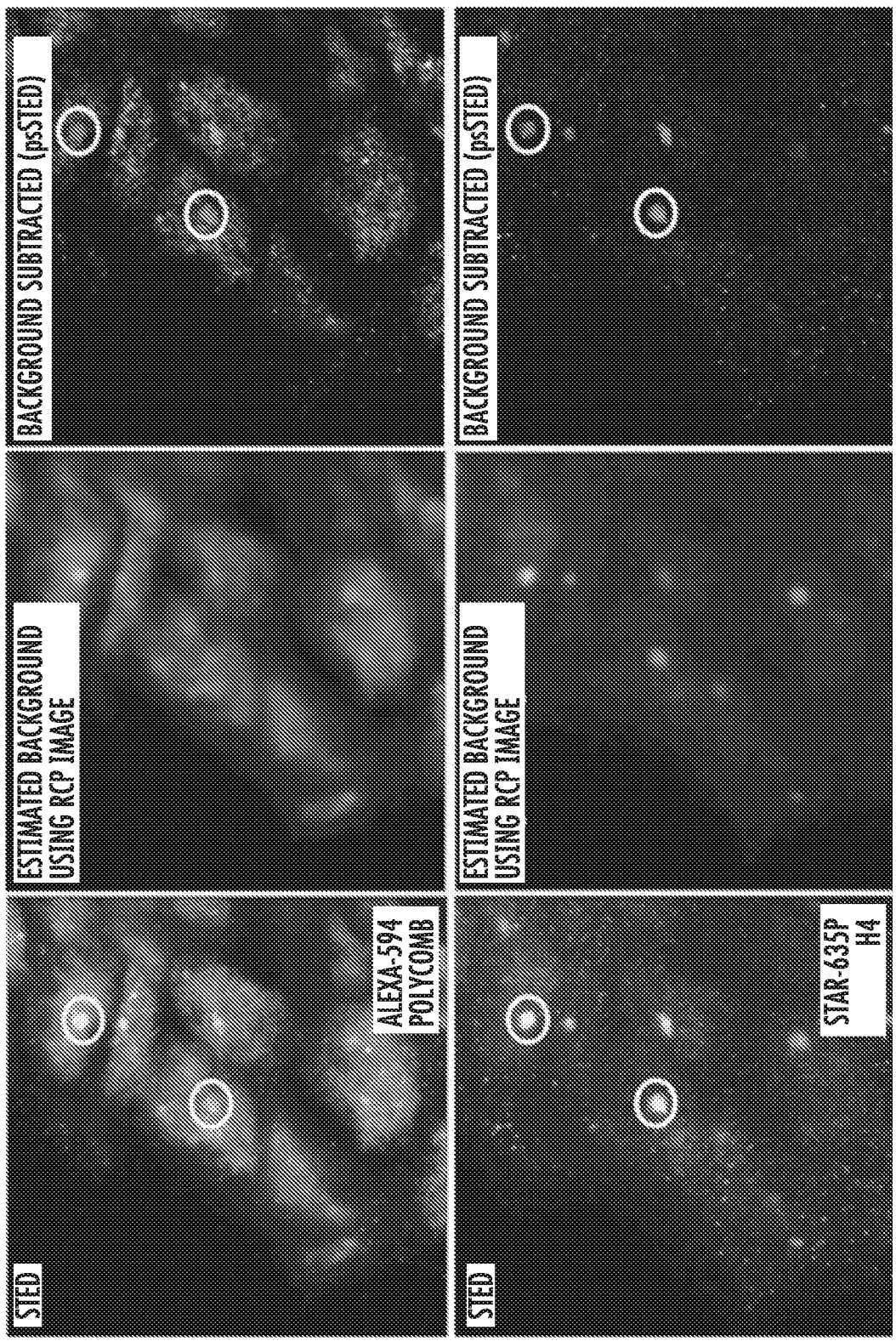
FIG. 16 illustrates an image view of psSTEAD used on embryo level imaging.

FIG. 16 illustrates an image view of psSTEAD used on embryo level imaging.

To predict the performance of psSTED in background suppression, several simulations were conducted assuming a three-level energy system for fluorophores. A set of differential equations is used to describe the temporal evolution of each state's population. After solving the equations numerically, the detectable fluorescence is calculated. Images with different STED beam powers and polarizations can therefore be simulated when the STED beam's intensity distribution in space is prescribed. For estimating the background arising from excitation by the STED beam, both the re-excitation (after STED-induced de-excitation) and direct excitation process by the STED beam are included, as illustrated in FIG. 9. Under the experimental conditions where a 100-picosecond excitation pulse is employed and a 300-picosecond STED pulse, the effect caused by STED re-excitation is small compared with the direct excitation by the STED beam. Simulated STED images of a single layer of beads show different background profiles between high STED power (XY-STED: 200 mW; Z-STED: 100 mW) and low STED power (XY-STED: 40 mW; Z-STED: 20 mW. As illustrated in FIGS. 10 and 11, because direct excitation-induced background increases with increasing STED power while background due to incomplete depletion decreases. The background in the X-Z cross sections of STED images was much more severe than that in the X-Y cross sections, highlighting the critical need of background suppression in 3D STED. Compared with the sub-STED method which can only suppress the STED excitation-related background, psSTED has better background suppression performance and this superiority is more evident when relatively low STED power is used, as illustrated in FIGS. 10 and 11.

To demonstrate the effectiveness of psSTED experimentally, a 3D STED setup with a modification was used, i.e., mounting a half wave-plate (HWP) before the objective lens with a motor-driven rotational stage for switching the STED beam polarization between LCP and RCP, as illustrated in FIG. 1A and FIG. 6. After image-based drift correction and median filtering of the RCP image, the RCP image was subtracted from the regular STED image with a subtraction factor γ to obtain the background-free psSTED image.

$$psSTED=STED_{LCP}-\gamma STED_{RCP}$$

γ corrects for photo-bleaching effect from sequential STED imaging, and is experimentally determined from confocal images obtained before and after STED imaging.

Ssingle-layer fluorescent nanobeads mounted on a coverslip (20 nm crimson beads, ThermoFisher Scientific) were used in an experimental implementation of the present invention. The background noise profile is affected by the density and the distribution of nearby fluorophores, excitation laser intensity, and by the STED laser wavelength and intensity, as illustrated in FIG. 2 and FIG. 10. Hence, two sets of experiments were performed, one with high STED power of 220 mW for XY-STED and 100 mW for Z-STED and the other with low STED power of 40 mW for XY-STED and 20 mW for Z-STED. The lateral and axial full-width at half-maximum (FWHM) of individual nano beads was 49.6±10.0 nm and 145.2±25.0 nm, respectively, with high STED power and was 98.1±16.2 nm and 273.4±40.3 nm with low STED power.

To quantitatively evaluate the background suppression performance, the signal to background ratio (SBR) of each image is calculated. psSTED achieved a >10-fold improvement in SBR compared to regular STED [high STED power: SBR=178.7 for psSTED vs 17.1 for STED; low STED power: SBR=199.1 for psSTED vs 17.3 for STED]. In comparison, the sub-STED method did not show improvement compared to regular STED [SBR=17.8 for high STED power and SBR=17.3 for low STED power]. This is because the noise source is not the direct excitation from STED laser (crimson beads have small excitation cross section at the STED wavelength), which sub-STED method is expected to suppress well. These results show that psSTED can achieve background suppression superior to sub-STED for both STED power regimes.

To further illustrated the present invention a series of psSTED experiments on biological samples were conducted. SiR-tubulin labeled mouse embryo fibroblast cells (3T3) were imaged with both 2D STED, as illustrated in FIG. 3A, and 3D STED, as illustrated in FIGS. 3B and 3C, and comparison was made between confocal, STED, and psSTED. psSTED achieved significantly better background suppression compared to the STED in all conditions, as indicated by the dramatically increased SBR from 10.2 to 66.4 in FIG. 3B, and from 2.16 to 125 in FIG. 3C. Notably, when 3D STED was used to examine the spatial distribution of microtubules in the XZ cross section, the low spatial frequency background was even more problematic, as illustrated in FIG. 3C. The out-of-focus background is so large in this case that the regular 3D STED image is shown to be very noisy. In contrast, psSTED counteracts the background noise well and reveals the super-resolved details which are otherwise submerged in the background. The FWHM of the microtubules in the psSTED images was 53.9±6.8 nm and 174.6±41.1 nm along the lateral and axial directions, respectively. In comparison, the FWHM in confocal images was 279.1±35.6 nm and 713.0±101.5 nm along the lateral and axial directions, respectively.

The background suppression capability of psSTED was further visualized by plotting a line profile across the image, as illustrated in FIG. 3D. The imaging contrast was enhanced and the microtubules were more clearly distinguished in psSTED. The spatial frequency component distribution of the cell images in FIGS. 3A-3E was expressed in the polar coordinates, as illustrated in FIGS. 12A-12C. Low spatial frequency components, which are detrimental to high-resolution imaging, are suppressed and the relative contributions of high spatial frequency components increased in psSTED compared to STED and confocal images as illustrated in FIGS. 3E and 12A-12C.

Actin filament bundles in human glioblastoma cells (LN229) labeled with SiR-actin were imaged using both 2D STED, as illustrated in FIG. 4A, and 3D STED, as illustrated in FIGS. 4B and 4C. Again, significantly reduced background in psSTED was achieved compared to STED in all conditions, as evidenced by the dramatically increased SBR in 3D STED [from 3.97 to 37.6 in XY cross-section, as in FIG. 4B, and from 2.91 to 31.3 in XZ cross-section, as in FIG. 4C. The FWHM of the actin filament bundles was 90.7±19.4 nm and 190.6±60.7 nm along the lateral and axial directions, respectively. The line profile plot, as illustrated in FIG. 4D, indicated with white arrows in FIG. 4B, clearly shows an improved contrast. In the spatial frequency domain analysis, psSTED suppresses low spatial frequency noise while preserving high spatial frequency components, as illustrated in FIG. 4E and FIGS. 13A-13C.

The background subtraction performance of psSTED was compared with that of previously reported sub-STED, g-STED and STEDD by simulating the spatial profile of detected fluorescence of a single fluorophore, as illustrated in FIG. 5A. sub-STED can only partially suppress the low-resolution background, mainly coming from the STED beam excitation, whereas the remaining background due to incomplete depletion is considerable, especially when low STED power is used. The time-gated g-STED approach reduces the low-resolution background by selectively rejecting the early photons which suffer from incomplete depletion. However, it appears to be inefficient in suppressing the background at the periphery. STEDD appears to work relatively well at high STED power (XY-STED: 200 mW; Z-STED: 100 mW) but the background remains high at low STED power (XY-STED: 40 mW; Z-STED: 20 mW). In contrast, psSTED exhibits the best background subtraction performance no matter which STED power regime is used thanks to its ability to estimate faithfully the low-resolution background in the RCP mode, as illustrated in FIGS. 5A-5E and FIG. 8. As a figure of merit for quantifying how well the background is subtracted, the inventors defined the sum of squared background photon number (SSBPN):

$$SSBPN=\Sigma(\text{photon number})^2 \text{ outside of the rectangle where fluorescence signal is detected.}$$

The size of the rectangle is reasonably chosen to be 480 nm (in X)×1056 nm (in Z), and is centered to the image, as illustrated in FIG. 5B. In an ideal background-free image, SSBPN must be zero. Hence, the smaller the SSBPN is, the better background subtraction is. Clearly, in both high and low STED power regimes, the unambiguous choice of γ=1 in psSTED (photobleaching was not included in the simulation) offers the best background subtraction compared to all three techniques: STEDD, sub-STED and g-STED, as illustrated in FIG. 5C and 5D. In the case of STEDD and sub-STED, an additional step to determine subtraction factor γ is required.

Randomly located beads in 3D space were simulated to compare the background subtraction techniques, as illustrated in FIG. 5E. At both high STED and low STED power regimes, psSTED subtracted the background much better than the other methods. In this particular simulation, the inventors calculated SBR as the maximum photon number divided by the minimum photon number within the image. The maximum and minimum photon numbers and SBR values of images are shown in Table 1. psSTED achieves much higher SBR compared to other methods. Note that psSTED images are at least two times brighter than the STEDD images. Hence, although psSTED requires acquiring data twice (with LCP and RCP), STEDD method must also acquire data with at least two times longer to achieve the same brightness as psSTED. Qualitatively and quantitatively, psSTED outperforms the previously proposed methods for background subtraction, while providing ease and simplicity of the implementation.

TABLE 1

Maximum, minimum photon numbers and signal-to-background ratio (SBR) of images of simulated beads is shown in FIG. 5E.

| | | STED | psSTED | sub-STED | g-STED | STEDD |
|---|---|---|---|---|---|---|
| High STED Power (XY-STED: 200 mW; Z-STED: 100 mW) | Max. photon number | 18516 | 8625 | 10944 | 13090 | 3956 |
| | Min. photon number | 8813 | 126 | 1992 | 6064 | 683 |
| | SBR (max/min) | 2.10 | 68.5 | 5.49 | 2.16 | 5.79 |
| Low STED Power (XY-STED: 40 mW; Z-STED: 20 mW) | Max. photon number | 41980 | 25011 | 36591 | 29176 | 12420 |
| | Min. photon number | 15620 | 637 | 10616 | 9940 | 2339 |
| | SBR (max/min) | 2.69 | 39.3 | 3.45 | 2.94 | 5.31 |

Because the STED effect is nonlinear in STED beam intensity, the spatial profile of the background noise can be a complex function of multiple variables such as the intensity and wavelength of STED and excitation lasers, the density and the distribution of the nearby fluorophores, STED and excitation pulse widths, and the property of the label itself. From the simulations and experimental results, the inventors demonstrated that psSTED suppresses background noise in different imaging conditions where different background sources dominate. In comparison to other background suppression methods, psSTED is much simpler, easier to implement and more effective. An additional half wave plate is essentially the only necessary component for psSTED. Although psSTED was demonstrated with a motorized rotation stage in this work, polarization switching can also be achieved by using an electro-optic modulator (EOM) if fast switching is desired for higher imaging speed or for fluorescence correlation spectroscopy (FCS) applications. Additionally, such fast polarization switching will make it unnecessary to measure the subtraction factor ($\gamma$). More involved devices such as complex timing circuitry or a time-correlated single photon counting (TCSPC) module is not needed in psSTED compared with other background suppression methods. Therefore, a new method is demonstrated to achieve background-free STED nanoscopy that is easy-to-implement and efficient, without the need for ambiguous parameter determination.

METHODS/EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The following Examples are offered by way of illustration and not by way of limitation.

Bead Sample Preparation.

A coverslip and a glass slide were washed with water and ethanol, then dried with dry air. They were then incubated with poly-L-lysine for 5 minutes to facilitate the attachment of fluorescent beads to the glass surface, followed by thorough washing with water and drying. Double sided tape is applied in between the coverslip and glass slide to make a chamber for fluorescent beads. Crimson beads (20 nm, 2% solid, ThermoFisher Scientific) were diluted 10,000 times into 1 M Tris HCl pH 7.5 solution and were flowed in the chamber. The chamber was sealed with 5-minute epoxy glue and incubated for at least 1 hour in the dark.

Cell Sample Preparation.

The mouse embryo fibroblast cells (3T3, ATCC) were cultured at 37° C. and 5% $CO_2$ in Dulbecco's modified Eagle's medium with 10% fetal bovine serum and 1× Gibco Antibiotic-Antimycotic (Thermo Fisher Scientific). Eight-well Lab-Tek II chambered cover-glass (Thermo Fischer Scientific) or glass bottom dish (In Vitro Scientific) were coated with fibronectin (Sigma) for 1 h before cells are seeded. After 24 h-48 h culturing (~80% confluency), the cells were fixed with 10 mM ethylene glycol bis(succinimidyl succinate) (EGS, Thermo Fisher Scientific) for 10 min and washed with 1× phosphate buffered saline (PBS) three times. The cells were then treated with 0.2% Triton X-100 for permeabilization, washed with 1×PBS three times, and incubated with 500 nM SiR-tubulin (Cytoskeleton, Inc.) for 30 min. After 3-times gentle washing, the cells were imaged in 1×PBS.

The human glioblastoma cells (LN229, ATCC) were cultured at 37° C. and 5% $CO_2$ in Dulbecco's modified Eagle's medium with 10% fetal bovine serum and antibiotics (100 unit $ml^{-1}$ penicillin and 100 μg $ml^{-1}$ streptomycin). Eight-well Lab-Tek II chambered coverglass (Thermo Fischer Scientific) or glass bottom dish (In Vitro Scientific) were coated with fibronectin (Sigma) for 1 h before cells are seeded. After 24 h-48 h culturing (~80% confluency), the cells were fixed with 4% paraformaldehyde (Electron Microscopy Sciences) for 10 min and then washed with 1× phosphate buffered saline (PBS) three times. The cells were then treated with 0.5% Triton X-100 (optional), washed with 1×PBS three times, and incubated with 400 nM SiR-actin (Cytoskeleton, Inc.) for 30 min. After 3-times gentle washing, the cells were imaged in 1×PBS.

Home-Built STED Microscope.

The microscope employs a mode-locked Ti: Sapphire femtosecond laser (MaiTai HP, Spectra Physics), which generates a train of <100 fs pulses at 80 MHz repetition rate. The laser is split into two beam paths for STED and excitation beams using HWP and PBS. STED laser pulse is stretched by two 15 cm long glass rods (N-SF57, Casix) and a 100 m long polarization maintaining single-mode fiber (PMJ-A3AHPC, 3S-633-4/125-3-100-1-SP, OZ optics) to the final pulse width of approximately 300 picoseconds. The two glass rods are mounted on a translation stage (PRL-12, Newport) so that the delay between the STED pulse and the excitation pulse can be optimized. In the excitation beam path, the supercontinuum light was generated by the 12 cm long photonic crystal fiber (FemtoWhite 800, NKT photonics) and was spectrally filtered using a short pass filter (FF01-680/SP, Semrock). A 15 cm long glass rod (N-SF57, Casix) stretches the excitation laser pulse to <100 ps. The supercontinuum was then triply filtered by an acousto-optic tunable filter (AOTFnC-400.650, AA Opto-Electronic) and coupled to a single-mode fiber (P5-488PM-FC-2, Thorlabs) to be used as an excitation beam. The triple-pass acousto-optic tunable filter allows the excitation beam to be wavelength selected or turned on/off with 1 μs response time and 1-2 nm bandwidth.

The fiber-delivered STED laser is collimated and spectrally filtered, and split by a HWP and a PBS with a variable splitting ratio. Each beam passed through a phase plate imprinted with a 0-2π vortex (VPP-1, RPC photonics) or 0-π binary circle to generate a XY- or Z-STED beam, respectively. The two STED beams were recombined at a 5 mm thick dichroic beam splitter (z740sprdc, Chroma) and left circularly polarized using an achromatic quarter-wave plate and a half-wave plate (RAC 4.4.15 and RAC 4.2.15, B. Halle Nachfl). The excitation beam was reflected by a 30:70 (R:T) beam splitter (BS019, Thorlabs). The fluorescence signal was collected by an oil immersion objective (1.4 NA HCX PL APO 100×, Leica) and spectrally filtered by BLP01-635R-25 (Semrock) and ET670/40 m (Chroma). Then, the fluorescence signal was imaged onto multimode fibers with a core diameter of 62.5 μm (M31L01, Thorlabs) and detected by a single-photon counting module (SPCM-AQR-14-FC, Perkin Elmer). The sample was scanned by a 3-axis piezo translational stage (MAX311D, Thorlabs); Imspector software was used for data collection.

Polarization Switching.

Polarization switching is achieved by rotating the HWP by π/4 using a motorized rotation stage (PRM1Z8). Rotation of HWP flips the vertically (horizontally) polarized light into horizontally (vertically) polarized light, which is, after the quarter-wave plate, effectively switching LCP(RCP) to RCP (LCP).

Drift Correction.

To correct the stage drift in between the regular STED image and background noise image, an image based drift correction was employed. The cross-correlation of the two images is calculated and the peak position of the cross-correlation was identified. The background noise image is shifted by the peak position accordingly.

Median Filter.

The noise suppression scheme subtracts the background noise image from the regular STED image. Upon subtraction, the variance of the output becomes $\sigma_{A-B}^2 = \sigma_A^2 + \sigma_B^2$. If the random salt and pepper noise exists in both of the images, subtraction can increase the amplitude of the random noise. To avoid this, a median filter of (15,15) pixels is applied on the background image.

SBR Calculation.

SBR can be calculated by estimating background by averaging the signal from the off-fluorescence region and dividing it from on-fluorescence signal maxima, $$SBR = \frac{on - fluorescence}{off - fluorescence}.$$

Photobleaching Correction.

In case substantial photobleaching occurs during subsequent STED imaging, the background image with RCP can be dimmer, leading to an underestimation of the background noise. A subtraction factor γ is estimated by dividing the total intensity of the confocal image of the same area before ($I_{BS}$) and after ($I_{AS}$) STED imaging: $\gamma = I_{BS}/I_{AS}$. Finally, the photobleaching artifact is corrected by $psSTED = STED_{LCP} - \gamma STED_{RCP}$. Typically, γ ranged from 1.0 to 2.25.

Theoretical Simulation Parameters.

In the case of psSTED and sub-STED, there is no time-gating, i.e., all photons in the time domain are collected, although psSTED can readily be combined with time-gating for a sharper PSF. In case of g-STED, the detection delay is set at 600 μs after the peak of STED pulse. In the case of STEDD, a second Gaussian STED power is chosen to be 10% of the first pulse with 2 ns delay with respect to the first pulse. The subtraction value γ is chosen such that the effective PSF, as illustrated in FIG. 5A, does not include negative values to avoid over-subtraction. The detection time windows for STED1 and STED2 are from 0 to 2 ns and from 2.2 ns to 5.3 ns after the peak of first STED pulse, respectively. For psSTED, γ=1 was chosen unambiguously.

Spatial Frequency Analysis.

To analyze confocal, STED and psSTED images more quantitatively, a 2D Fourier transform is performed to transfer the image to the 2D spatial frequency space. Then, the 2D Fourier transformed image is coordinate-transformed into polar coordinate (θ,r). The intensity as a function of spatial frequency can be calculated by integrating it over angular (θ) coordinate, and normalizing it to make sum of all intensities to 1.

The used fluorophore can be regarded as a three-level system with the ground state S0, its higher vibrational sub-level S0* and the electronic excited energy state S1, as illustrated in FIG. 11. When the excitation and STED pulse come to interact with the 90 molecule, the rate equations for the occupancy probability of each state are $$\frac{dP_{S1}}{dt} = k_{exc}P_{S0} - k_f P_{S1} - k_{STED}P_{S1} + k_{STED}P_{S0*} + k_{Dir-STED}P_{S0}, \quad (s1)$$

$$\frac{dP_{S0*}}{dt} = k_{STED}P_{S1} - k_{vib}P_{S0*} - k_{STED}P_{S0*}, \quad (s2)$$

$$\frac{dP_{S0}}{dt} = -k_{exc}P_{S0} + k_{vib}P_{S0*} + k_f P_{S1} - k_{Dir-STED}P_{S0}, \quad (s3)$$

where $k_{exc}$ is the pumping rate by the excitation pulse, $k_f$ is the spontaneous emission rate, $k_{STED}$ is the stimulated emission and re-excitation rate by the STED pulse, $k_{Dir-STED}$ is the direct excitation rate by the STED pulse, and $k_{vib}$ is the vibration relaxation rate, respectively. Note that herein, for the first time, clarify the STED-pulse excitation by dividing it into two parts, the re-excitation and direct excitation process. Their corresponding rates are represented as $k_{STED}P_{S0*}$ and $k_{dir-STED}P_{S0}$, respectively, shown in Eqs. (s1)-(s3).

Considering that the vibration sub-level has a very short lifetime (~0.2 μs), compared with the spontaneous lifetime (at the nanosecond scale) and stimulated emission/re-excitation by the STED pulse, the equilibration of the S0* population is assumed to be:

$$\frac{dP_{S0*}}{dt} = k_{STED}P_{S1} - k_{vib}P_{S0*} - k_{STED}P_{S0*} = 0, \quad (s4)$$

then $$P_{S0^*} = \frac{k_{STED}}{k_{vib} + k_{STED}} P_{S1}, \tag{s5}$$

Suppose that $$P_{S0} + P_{S0^*} + P_{S1} = 1, \tag{s6}$$

by substituting (s5)-(s6) into (s1), a single-variable differential equation in terms of $P_{S1}$ is $$\frac{dP_{S1}}{dt} = -(k_1 + k_2 + k_3)P_{S1} + k_2, \tag{s7}$$

Where $$k_1 = k_f(1 + \gamma), \tag{s8}$$

$$k_2 = k_{Dir-STED} + k_{exc}, \tag{s9}$$

$$k_3 = k_2 \frac{k_{STED}}{k_{vib} + k_{STED}}, \tag{s10}$$

And $$\gamma = \frac{k_{STED}}{k_f} \frac{k_{vib}}{k_{vib} + k_{STED}}. \tag{s11}$$

Note that $k_1$, $k_2$ and $k_3$ are time dependent, since $$k_{exc}(t) = I_{exc}(t)\sigma_{exc}\lambda_{exc}/(hc), \tag{s12}$$

$$k_{STED/Dir-STED}(t) = I_{STED}(t)\sigma_{STEP/Dir-STED}\lambda_{STED}/(hc), \tag{s13}$$

where $\sigma_{(\cdot)}$ represents the cross section of each process, that is, pumping by the excitation pulse, stimulated emission/re-excitation, and direct excitation by the STED pulse. $\lambda_{(\cdot)}$ is the excitation/STED pulse wavelength. h is the Planck's constant and c is the light velocity. Within one period of the excitation and STED laser, the temporal intensity profiles of the excitation and STED pulses are described as Gaussian functions:

$$I_{exc}(t) = I_{exc-peak} \exp\left[-\left(\frac{t-t_0}{\tau_{exc}/2}\right)^2\right], 0 \le t < T, \tag{s14}$$

$$I_{STED}(t) = I_{STED-peak} \exp\left[-\left(\frac{t-t_0-t_d}{\tau_{STED}/2}\right)^2\right], 0 \le t < T, \tag{s15}$$

where $\tau_{exc}$ and $\tau_{STED}$ are the widths of the excitation and STED pulse, respectively, $t_0 = 2\tau_{STED}$ is the time point of the excitation pulse peak, $t_d$ is the time delay from the excitation to the STED pulse, and T is the period of high repetition Ti:Sa laser.

Considering that Eq. (s7) is a non-stiff differential equation, which means the solution is not sensitive to the step size and doesn't contain drastic oscillations, it is solved iteratively with a fixed step $\Delta t$ by $$P_{S3}(t_n) = P_{S1}(t_{n-1})\exp\left[-\sum_{i=1}^{3} k_i(t_{n-1})\Delta t\right] + \tag{s16}$$

-continued $$\frac{k_2(t_{n-1})}{\sum_{i=1}^{3} k_i(t_{n-1})}\left(1 - \exp\left[-\sum_{i=1}^{3} k_i(t_{n-1})\Delta t\right]\right),$$

where $t_n = n\Delta t$ ($n = 0, 1, 2, \ldots$) and $\Delta t = 2$ps throughout this work. Because for most types of fluorophores the lifetime is much shorter than T, the electron(s) are supposed to return to the ground state at the beginning of each laser period, or)

$$P_{S1}(t_0 = 0) = 0. \tag{s17}$$

The detectable fluorescence in one laser period T is calculated by $$F_T = \eta \int_0^T k_f P_{S1}(t) Q dt = \eta k_f Q \int_0^T P_{S1}(t) dt, \tag{s18}$$

where Q is the quantum yield of fluorophores and $\eta$ is the overall detection efficiency considering the loss caused by the limited numerical aperture NA of the used objective and photon capture efficiency of the detector (90%):

$$\eta = 2\pi\left[1 - \cos\left(\sin^{-1}\frac{NA}{n_{oil}}\right)\right] / (4\pi) \times 0.9. \tag{s19}$$

From Eq. (s18), the effective excitation PSF can be obtained only if the peak intensity distributions of the excitation and STED pulse are determined. The normalized patterns of the focused excitation and STED spot [$\tilde{I}_{(\cdot)-peak}(x,y,z)$] are calculated by using the Debye integration based vector diffraction formula with chirp-z transform, and then the peak intensity distribution with $Power_{(\cdot)}$ is obtained by $$I_{(\cdot)-peak}(x, y, z) = \tilde{I}_{(\cdot)-peak}(x, y, z)\frac{Power_{(\cdot)}}{A}\frac{T}{\tau_{(\cdot)}}\frac{2}{\sqrt{\pi}}, \tag{s20}$$

Where $$A = \int \tilde{I}_{(\cdot)-peak}(x,y,z=0)dxdy \tag{s21}$$

represents the area occupied by the excitation or STED spots at the focal plane. Assume the pixel dwelling time $T_{dwelling}$, the excitation PSF is $$PSF_{(exc)}(x, y, z) = F_T(x, y, z; Power_{(\cdot)})\frac{T_{dwelling}}{T}. \tag{s22}$$

In confocal-based microscope setups, the final PSF is the product of the excitation PSF and that of the detection part with the pinhole size taken into considerations:

$$PSF(x,y,z) = PSF_{exc}(x,y,z) \times [PSF_{det}(x,y,z) \otimes D(x,y,z)]. \tag{s23}$$

$PSF_{det}$ is the detection PSF for an infinitely small pinhole and calculated using Debye integration given random polarization and approximate inverse cosine intensity distribution at the pupil plane. $D(x,y,z)$ represents the pinhole transmission function (1 Airy unit is used throughout the work) and $\otimes$ is the convolution process.

Given the sample spatial distribution, the final image with different excitation and STED beam power is the convolution between the object structure and the corresponding PSF shown in Eqs. (s22)-(s23), and calculated by using 3D fast Fourier transform.

For the laser-related parameters, the pulse widths of $\tau_{exc} = 100$ ps, $\tau_{STED} = 300$ ps and laser period of T=12.5 ns are used throughout this work, which are also agree with the experimental setup. For the fluorophore-specific parameters, $k_f=1/(3.5$ ns), $k_{vib}=1/(0.2$ ps), $\sigma_{exc}=5.7E-16$ cm$^2$, $\sigma_{STED}=0.23E-16$ cm$^2$, while the direct excitation cross section at the STED wavelength is estimated ($\lambda_{STED}=780$ nm) as $\sigma_{dir-STED}=5.7E-21$ cm$^2$, which is an order smaller than Ref 1, but better fitted with experimental observations. Note that the simulation was also tested with the parameters exactly equal to above and psSTED in that condition also outperforms STEDD. The quantum yield Q is set as 0.65. All the simulation images were obtained using a NA=1.4 oil-immersion objective with assuming a 400-us dwelling time, while ignoring any blinking or photo-bleaching phenomenon. The last but critical parameter needed to be determined is the pulse delay $t_d$ from the excitation to the STED pulse. By plotting the depletion efficiency as a function of the STED beam intensity with different pulse delay, as illustrated in FIG. 14, $t_d=150$ μs will provide a good compromise between the depletion efficiency and residue fluorescence, and was applied throughout.

Historically there had been a confusion between the STED re-excitation and direct excitation background. For using a relatively long STED pulse (>100 μs) which is the common case in STED nanoscopy, the STED re-excitation process is negligible. To examine the effect of STED re-excitation, that process is "artificially" deleted process and rewrite the rate equations:

$$\frac{dP_{S1}^{\dagger}}{dt} = k_{exc}P_{S0}^{\dagger} - k_f P_{S1}^{\dagger} - k_{STED}P_{S1}^{\dagger} + k_{dir-STED}P_{S0}^{\dagger}, \quad (s24)$$

$$\frac{dP_{S0^*}^{\dagger}}{dt} = k_{STED}P_{S1}^{\dagger} - k_{vib}P_{S0^*}^{\dagger} = 0, \quad (s25)$$

where † denotes that the corresponding value is calculated without the STED re-excitation process. By the same way, a single-variant differential equation in terms of $P_{S1}^{\dagger}$ is:

$$\frac{dP_{S1}^{\dagger}}{dt} = -(k_1^{\dagger} + k_2 + k_3^{\dagger})P_{S1}^{\dagger} + k_2. \quad (s26)$$

The introduced $k_2$ is the same as given by Eq. (s9), while $$k_1^{\dagger} = k_f + k_{STED}, \quad (s27)$$

$$k_3^{\dagger} = k_2 \frac{k_{STED}}{k_{vib}}, \quad (s28)$$

which are slightly different from those with STED re-excitation taken into considerations.

The detectable fluorescence without STED re-excitation can be calculated in a similar way as Eqs. (s16)-(s19). As shown in FIG. 15, the difference of the fluorescence with or without STED re-excitation is so small compared with the effect caused by STED direct excitation. This is also consistent with the statement in the previous works that stretching pulses can avoid the STED re-excitation problem.

It should be noted that the software associated with the present invention is programmed onto a non-transitory computer readable medium that can be read and executed by any of the computing devices mentioned in this application. The non-transitory computer readable medium can take any suitable form known to one of skill in the art. The non-transitory computer readable medium is understood to be any article of manufacture readable by a computer. Such non-transitory computer readable media includes, but is not limited to, magnetic media, such as floppy disk, flexible disk, hard disk, reel-to-reel tape, cartridge tape, cassette tapes or cards, optical media such as CD-ROM, DVD, Blu-ray, writable compact discs, magneto-optical media in disc, tape, or card form, and paper media such as punch cards or paper tape. Alternately, the program for executing the method and algorithms of the present invention can reside on a remote server or other networked device. Any databases associated with the present invention can be housed on a central computing device, server(s), in cloud storage, or any other suitable means known to or conceivable by one of skill in the art. All of the information associated with the application is transmitted either wired or wirelessly over a network, via the internet, cellular telephone network, RFID, or any other suitable data transmission means known to or conceivable by one of skill in the art.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of stimulated emission depletion (STED) microscopy using background suppression comprising:
   generating from a STED microscope a first image of a specimen and of background noise;
   changing the polarization of a beam from the STED microscope and obtaining a second image of the background noise;
   subtracting the second image from the first image to eliminate the background noise; and,
   generating a revised image of the specimen without the background noise.

2. The method of claim 1 wherein the first image is produced by using a first STED spot having a hollow core.

3. The method of claim 1 wherein the second image is produced by using a second STED spot having a hollow core where the hollow core is filled.

4. The method of claim 3 wherein the hollow core is filled by the components selected from the group consisting of optical components; passive phase modulation components; active phase modulation components, or a combination thereof.

5. The method of claim 4 wherein the optical components are selected from a group consisting of waveplates, electro-optic modulators, acousto-optic modulators, deformable mirrors, Faraday rotators, interferometers, and combinations thereof.

6. The method of claim 4 wherein the optical components are modulating the polarization of the first STED spot having a hollow core to produce the second STED spot where the hollow core is filled.

7. The method of claim 4 wherein the passive phase modulation components are selected from a group consisting of phase plates, wave plates, free form mirrors, interferometers, and a combination thereof.

8. The method of claim 4 wherein the active phase modulation components are selected from a group consisting of spatial light modulators, deformable mirrors, micro mirror arrays, and a combination thereof.

9. The method of claim 1, wherein the revised image has enhanced clarity when compared to a reference image of a reference STED unable to produce the second image.

10. The method of claim 1 wherein subtracting the second image from the first image is performed using methods selected from a group consisting of image by image subtraction, pixel by pixel subtraction, real-time pixel by pixel subtraction, image-based drift correction, fiducial marker-based drift correction, median filtering of the background image, smoothing of the background image, and a combination thereof.

11. A method of claim 1 wherein subtracting the second image from the first image is performed using a subtraction factor.

12. The method of claim 11 wherein the subtraction factor is multiplied with the second image.

13. A method of claim 11 wherein the subtraction factor is estimated by confocal images obtained before and after STED imaging, widefield images obtained before and after STED imaging, estimated photobleaching values, total intensity of images obtained before and after STED imaging, and combinations thereof.

14. A method of claim 1 wherein the performance of eliminating the background noise is estimated by using methods selected from a group consisting of: (a) peak signal-to-background ratio (PSBR) where $$PSBR = \frac{Max - Min}{Min},$$

Max: maximum photon number in the image, Min: minimum photon number in the image; (b) signal-to-background ratio (SBR) where $$SBR = \frac{on - fluorescence}{off - fluorescence};$$

(c) sum of squared background photon number (SSBPN) where SSBPN=$\Sigma(BPN)^2$, BPN: background photon number; (d) spatial frequency analysis; and combinations thereof.

15. The method of claim 1 further comprising a non-transitory computer readable medium.

16. The method of claim 1 wherein the specimen is of a live cell, a fixed cell, a tissue, a solid-state sample, a liquid-state sample, a group of fluorescent molecules in solution, or a combination thereof.

17. The method of claim 1 where the background suppression is combined with multi-color imaging; fluorescence correlation spectroscopy, fluorescence lifetime imaging, fluorescence resonance energy transfer, correlative imaging with electron microscopy, reversible saturable optical fluorescence transitions microscopy, and combinations thereof.

18. A system for stimulated emission depletion microscopy using background suppression comprising:
   a stimulated emission depletion (STED) microscope, wherein the STED microscope is configured for:
   generating a first image of a specimen and of background noise;
   changing the polarization of a beam from the STED microscope and obtaining a second image of the background noise; and
   a non-transitory computer readable medium programmed for subtracting the second image from the first image to eliminate the background noise; and,
   generating a final image of the specimen without the background noise.

19. The system of claim 18 wherein optical components for the STED microscope are selected from a group consisting of waveplates, electro-optic modulators, acousto-optic modulators, deformable mirrors, Faraday rotators, interferometers, and combinations thereof.

20. The system of claim 19 wherein the optical components are modulating the polarization of the first STED spot having a hollow core to produce the second STED spot where the hollow core is filled.

* * * * *